United States Patent
Saggar et al.

(10) Patent No.: US 12,207,261 B2
(45) Date of Patent: Jan. 21, 2025

(54) PHYSICAL UPLINK CONTROL CHANNEL RESOURCE ALLOCATION TECHNIQUES

(71) Applicant: QUALCOMM Incorporated, San Diego, CA (US)

(72) Inventors: Hemant Saggar, Irvine, CA (US); Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 270 days.

(21) Appl. No.: 17/547,597

(22) Filed: Dec. 10, 2021

(65) Prior Publication Data

US 2023/0189266 A1 Jun. 15, 2023

(51) Int. Cl.
*H04W 72/21* (2023.01)
*H04W 72/0446* (2023.01)

(52) U.S. Cl.
CPC ....... *H04W 72/21* (2023.01); *H04W 72/0446* (2013.01)

(58) Field of Classification Search
CPC ............ H04W 72/04; H04W 72/0413; H04W 72/0446
See application file for complete search history.

(56) References Cited

U.S. PATENT DOCUMENTS

| | | | | |
|---|---|---|---|---|
| 2017/0164352 A1* | 6/2017 | Yang | ............ | H04W 72/21 |
| 2018/0110057 A1* | 4/2018 | Park | ............ | H04W 74/0808 |
| 2018/0287753 A1* | 10/2018 | Sun | ............ | H04L 5/0048 |
| 2019/0229963 A1* | 7/2019 | Thomas | ............ | H04L 27/2636 |
| 2019/0319823 A1* | 10/2019 | Akkarakaran | ........ | H04W 76/27 |
| 2020/0221444 A1* | 7/2020 | Tiirola | ............ | H04W 72/21 |
| 2021/0367729 A1 | 11/2021 | Huang et al. | | |
| 2021/0392625 A1* | 12/2021 | Lin | ............ | H04W 72/23 |

(Continued)

OTHER PUBLICATIONS

Intel Corporation: "On Potential Techniques for PUCCH Coverage Enhancement", 3GPP TSG RAN WG1 #103-e, R1-2009602, 3rd Generation Partnership Project, Mobile Competence Centre, 650, Route Des Lucioles, F-06921 Sophia-Antipolis Cedex, France, vol. RAN WG1. No. e-Meeting, Oct. 26, 2020-Nov. 13, 2020, Nov. 11, 2020, XP051953502, pp. 1-13, paragraph [0003].

(Continued)

*Primary Examiner* — Chi Ho A Lee
(74) *Attorney, Agent, or Firm* — QUALCOMM Incorporated

(57) ABSTRACT

Methods, systems, and devices for wireless communications are described. A user equipment (UE) and a base station may support communicating uplink control messages over a physical uplink control channel (PUCCH) using a time domain waveform. For example, the base station may configure the UE with a first group of PUCCH resource sets associated with a first type of time domain waveform and a second group of PUCCH resource sets associated with a second type of time domain waveform. The base station may transmit downlink control information (DCI) to the UE that indicates a type of time domain waveform and a PUCCH resource of a PUCCH resource set. In response, the UE may select the PUCCH resource set from either the first group or the second group and may transmit an uplink control message using the indicated PUCCH resource and type of time domain waveform.

30 Claims, 19 Drawing Sheets

(56) References Cited

U.S. PATENT DOCUMENTS

| | | | |
|---|---|---|---|
| 2022/0078825 A1* | 3/2022 | Davydov | H04L 5/0007 |
| 2022/0321305 A1* | 10/2022 | Xiao | H04L 1/1854 |
| 2022/0377619 A1* | 11/2022 | Grant | H04L 5/0044 |
| 2023/0023656 A1* | 1/2023 | Rastegardoost | H04W 72/0446 |
| 2023/0054155 A1 | 2/2023 | Saggar et al. | |

OTHER PUBLICATIONS

International Search Report and Written Opinion—PCT/US2022/079948—ISA/EPO—Mar. 27, 2023.

\* cited by examiner

PHYSICAL UPLINK CONTROL CHANNEL RESOURCE ALLOCATION TECHNIQUES

FIELD OF TECHNOLOGY

The following relates to wireless communications, including physical uplink control channel (PUCCH) resource allocation techniques.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support communications between communications devices (e.g., a UE, a base station) over upper frequency bands, such as an FR4 frequency band including frequencies up to 114 Gigahertz (GHz) or an FR5 frequency band including frequencies up to 275 GHz, among other upper frequency bands. In some examples, a UE may transmit physical uplink control channel (PUCCH) messages to a base station over an upper frequency band and using a frequency domain waveform, such as an orthogonal frequency division multiplexing (OFDM) waveform, among other frequency domain waveforms. However, in some cases, transmitting PUCCH messages using frequency domain waveforms over an upper frequency band may suffer from increased phase noise, complexity, and power consumption.

SUMMARY

The described techniques relate to improved methods, systems, devices, and apparatuses that support physical uplink control channel (PUCCH) resource allocation techniques. Generally, the described techniques provide for enabling the communication of PUCCH messages using time domain waveforms. For example, a base station may configure a user equipment (UE) with PUCCH resources that support the use of time domain waveforms in transmitting uplink control messages over the PUCCH resources. For instance, the base station may transmit signaling (e.g., one or more downlink control messages) to the UE that indicates a first group of PUCCH resource sets and a second group of PUCCH resource sets. The first group may include PUCCH resource sets associated with a first type of time domain waveform (e.g., a sequence-based non-coherent time domain waveform), and the second group may include PUCCH resource sets associated with a second type of time domain waveform (e.g., a demodulation reference signal (DMRS) based coherent time domain waveform). Additionally, each PUCCH resource set of the first group and the second group may include one or more PUCCH resources that each correspond to a respective set of parameters associated with transmitting uplink control messages using a time domain waveform (e.g., the first type or the second type).

The base station may transmit downlink control information (DCI) to the UE that indicates the first group of PUCCH resource sets or the second group of PUCCH resource sets, for example, by indicating a type of time domain waveform for transmitting an uplink control message. The DCI may further indicate a PUCCH resource of a UE-selected PUCCH resource set to use to transmit the uplink control message. For example, in response to receiving the DCI, the UE may select a PUCCH resource set from the first group or the second group based on the type of time domain waveform indicated by the DCI (e.g., from the first group if the DCI indicates the first type, from the second group if the DCI indicates the second type). The UE may also select the PUCCH resource set based on a quantity of control bits to be transmitted in the uplink control message. The UE may further select the PUCCH resource within the selected PUCCH resource set that is indicated by the DCI. Using the selected PUCCH resource, the UE may transmit the uplink control message to the base station according to the indicated type of time domain waveform and the respective set of parameters associated with the selected PUCCH resource.

A method for wireless communication at a UE is described. The method may include receiving, from a base station, signaling indicating a first group of PUCCH resource sets associated with a first type of time domain waveform for transmitting uplink control messages and a second group of PUCCH resource sets associated with a second type of time domain waveform for transmitting uplink control messages, receiving, from the base station, DCI indicating a type of time domain waveform for transmitting an uplink control message and a first resource of a PUCCH resource set for transmitting the uplink control message, the PUCCH resource set from the first group or the second group based on the type of time domain waveform, and transmitting, to the base station and in accordance with the type of time domain waveform, the uplink control message over the first resource of the PUCCH resource set.

An apparatus for wireless communication at a UE is described. The apparatus may include a processor, memory coupled with the processor, and instructions stored in the memory. The instructions may be executable by the processor to cause the apparatus to receive, from a base station, signaling indicating a first group of PUCCH resource sets associated with a first type of time domain waveform for transmitting uplink control messages and a second group of PUCCH resource sets associated with a second type of time domain waveform for transmitting uplink control messages, receive, from the base station, DCI indicating a type of time domain waveform for transmitting an uplink control message and a first resource of a PUCCH resource set for transmitting the uplink control message, the PUCCH resource set from the first group or the second group based on the type of time domain waveform, and transmit, to the base station and in accordance with the type of time domain waveform, the uplink control message over the first resource of the PUCCH resource set.

Another apparatus for wireless communication at a UE is described. The apparatus may include means for receiving, from a base station, signaling indicating a first group of PUCCH resource sets associated with a first type of time domain waveform for transmitting uplink control messages and a second group of PUCCH resource sets associated with a second type of time domain waveform for transmitting uplink control messages, means for receiving, from the base station, DCI indicating a type of time domain waveform for transmitting an uplink control message and a first resource of a PUCCH resource set for transmitting the uplink control message, the PUCCH resource set from the first group or the second group based on the type of time domain waveform, and means for transmitting, to the base station and in accordance with the type of time domain waveform, the uplink control message over the first resource of the PUCCH resource set.

A non-transitory computer-readable medium storing code for wireless communication at a UE is described. The code may include instructions executable by a processor to receive, from a base station, signaling indicating a first group of PUCCH resource sets associated with a first type of time domain waveform for transmitting uplink control messages and a second group of PUCCH resource sets associated with a second type of time domain waveform for transmitting uplink control messages, receive, from the base station, DCI indicating a type of time domain waveform for transmitting an uplink control message and a first resource of a PUCCH resource set for transmitting the uplink control message, the PUCCH resource set from the first group or the second group based on the type of time domain waveform, and transmit, to the base station and in accordance with the type of time domain waveform, the uplink control message over the first resource of the PUCCH resource set.

Some examples of the method, apparatuses, and non-transitory computer-readable medium described herein may further include operations, features, means, or instructions for selecting the PUCCH resource set from the first group based on a quantity of control bits included in the uplink control message and the type of time domain waveform corresponding to the first type of time domain waveform and selecting the first resource within the PUCCH resource set based on the DCI.

Some examples of the method, apparatuses, and non-transitory computer-readable medium described herein may further include operations, features, means, or instructions for selecting the PUCCH resource set from the second group based on a quantity of control bits included in the uplink control message and the type of time domain waveform corresponding to the second type of time domain waveform and selecting the first resource within the PUCCH resource set based on the DCI.

In some examples of the method, apparatuses, and non-transitory computer-readable medium described herein, the signaling further indicates a respective quantity of resources included in each PUCCH resource set of the first group, each resource corresponding to a respective set of parameters associated with transmitting uplink control messages over the resource, and the uplink control message may be transmitted in accordance with a first set of parameters corresponding to the first resource.

In some examples of the method, apparatuses, and non-transitory computer-readable medium described herein, the first set of parameters includes a starting symbol of the first resource in a first slot or a first subframe, a first quantity of repetitions of the first resource in the first slot or the first subframe, a second quantity of repetitions of the first resource in a second slot or a second subframe, a starting location of the first resource within the starting symbol, a type of sequence for transmitting the uplink control message, an indication of whether to use one or more cyclic shifts, one or more roots of a sequence, or both, to indicate information included in the uplink control message, a beam hopping configuration, a time hopping configuration, a cover code, or a combination thereof.

In some examples of the method, apparatuses, and non-transitory computer-readable medium described herein, the first set of parameters includes a quantity of symbols included in the first resource, a quantity of PUCCH components included in the first resource, a length of each PUCCH component, or a combination thereof and the length may be based on a length of a sequence used to transmit uplink control messages over the first resource.

In some examples of the method, apparatuses, and non-transitory computer-readable medium described herein, the signaling further indicates a respective quantity of resources included in each PUCCH resource set of the second group, each resource corresponding to a respective set of parameters associated with transmitting uplink control messages over the resource and the uplink control message may be transmitted in accordance with a first set of parameters corresponding to the first resource.

In some examples of the method, apparatuses, and non-transitory computer-readable medium described herein, the first set of parameters includes a starting symbol of a first slot or a first subframe, a first quantity of repetitions of the first resource in the first slot or the first subframe, a second quantity of repetitions of the first resource in a second slot or a second subframe, a starting location of a PUCCH within the starting symbol, an indication of whether data, DMRSs, time gaps, or a combination thereof, may be multiplexed on the first resource, a density of DMRSs included in the uplink control message, a percentage of signals transmitted over the first resource that may be DMRSs, a beam hopping configuration, a time hopping configuration, a cover code, or a combination thereof.

In some examples of the method, apparatuses, and non-transitory computer-readable medium described herein, the first set of parameters includes a quantity of symbols included in the first resource, a quantity of PUCCH components included in the first resource, a length of each PUCCH component, or a combination thereof.

In some examples of the method, apparatuses, and non-transitory computer-readable medium described herein, the length of each PUCCH component corresponds to a minimum time interval that includes a DMRS block, a minimum time interval that includes at least a threshold quantity of DMRS samples, or a fixed time interval that may be based on a bandwidth associated with the first resource.

In some examples of the method, apparatuses, and non-transitory computer-readable medium described herein, the first set of parameters includes a starting symbol of a first DMRS block that may be shared by a set of UEs including the UE, a starting location of the first DMRS block in the starting symbol of the first DMRS block, a length of the first DMRS block, a starting symbol of a second DMRS block that may be specific to the UE, a starting location of the second DMRS block in the starting symbol of the second DMRS block, a length of the second DMRS block, or a combination thereof.

In some examples of the method, apparatuses, and non-transitory computer-readable medium described herein, each PUCCH resource set of the first group and the second group may be associated with transmitting a respective quantity of control bits and the PUCCH resource set may be based on a quantity of control bits included in the uplink control message.

In some examples of the method, apparatuses, and non-transitory computer-readable medium described herein, the first type of time domain waveform corresponds to a sequence-based time domain waveform that excludes DMRSs and the second type of time domain waveform corresponds to a time domain waveform that includes one or more DMRSs.

In some examples of the method, apparatuses, and non-transitory computer-readable medium described herein, the first resource of the PUCCH resource set may be further indicated based on a starting location of a physical downlink control channel (PDCCH) within a symbol or a slot, the DCI transmitted over the PDCCH.

A method for wireless communication at a base station is described. The method may include transmitting, to a UE, signaling indicating a first group of PUCCH resource sets associated with a first type of time domain waveform for transmitting uplink control messages and a second group of PUCCH resource sets associated with a second type of time domain waveform for transmitting uplink control messages, transmitting, to the UE, DCI indicating a type of time domain waveform for transmitting an uplink control message and a first resource of a selected PUCCH resource set for transmitting the uplink control message, the selected PUCCH resource set from the first group or the second group based on the type of time domain waveform, and receiving, from the UE and in accordance with the type of time domain waveform, the uplink control message over the first resource of the selected PUCCH resource set.

An apparatus for wireless communication at a base station is described. The apparatus may include a processor, memory coupled with the processor, and instructions stored in the memory. The instructions may be executable by the processor to cause the apparatus to transmit, to a UE, signaling indicating a first group of PUCCH resource sets associated with a first type of time domain waveform for transmitting uplink control messages and a second group of PUCCH resource sets associated with a second type of time domain waveform for transmitting uplink control messages, transmit, to the UE, DCI indicating a type of time domain waveform for transmitting an uplink control message and a first resource of a selected PUCCH resource set for transmitting the uplink control message, the selected PUCCH resource set from the first group or the second group based on the type of time domain waveform, and receive, from the UE and in accordance with the type of time domain waveform, the uplink control message over the first resource of the selected PUCCH resource set.

Another apparatus for wireless communication at a base station is described. The apparatus may include means for transmitting, to a UE, signaling indicating a first group of PUCCH resource sets associated with a first type of time domain waveform for transmitting uplink control messages and a second group of PUCCH resource sets associated with a second type of time domain waveform for transmitting uplink control messages, means for transmitting, to the UE, DCI indicating a type of time domain waveform for transmitting an uplink control message and a first resource of a selected PUCCH resource set for transmitting the uplink control message, the selected PUCCH resource set from the first group or the second group based on the type of time domain waveform, and means for receiving, from the UE and in accordance with the type of time domain waveform, the uplink control message over the first resource of the selected PUCCH resource set.

A non-transitory computer-readable medium storing code for wireless communication at a base station is described. The code may include instructions executable by a processor to transmit, to a UE, signaling indicating a first group of PUCCH resource sets associated with a first type of time domain waveform for transmitting uplink control messages and a second group of PUCCH resource sets associated with a second type of time domain waveform for transmitting uplink control messages, transmit, to the UE, DCI indicating a type of time domain waveform for transmitting an uplink control message and a first resource of a selected PUCCH resource set for transmitting the uplink control message, the selected PUCCH resource set from the first group or the second group based on the type of time domain waveform, and receive, from the UE and in accordance with the type of time domain waveform, the uplink control message over the first resource of the selected PUCCH resource set.

In some examples of the method, apparatuses, and non-transitory computer-readable medium described herein, the signaling further indicates a respective quantity of resources included in each PUCCH resource set of the first group, each resource corresponding to a respective set of parameters associated with transmitting uplink control messages over the resource, and the uplink control message may be received in accordance with a first set of parameters corresponding to the first resource.

In some examples of the method, apparatuses, and non-transitory computer-readable medium described herein, the first set of parameters includes a starting symbol of the first resource in a first slot or a first subframe, a first quantity of repetitions of the first resource in the first slot or the first subframe, a second quantity of repetitions of the first resource in a second slot or a second subframe, a starting location of the first resource within the starting symbol, a type of sequence for transmitting the uplink control message, an indication of whether to use one or more cyclic shifts, one or more roots of a sequence, or both, to indicate information included in the uplink control message, a beam hopping configuration, a time hopping configuration, a cover code, or a combination thereof.

In some examples of the method, apparatuses, and non-transitory computer-readable medium described herein, the first set of parameters includes a quantity of symbols included in the first resource, a quantity of PUCCH components included in the first resource, a length of each PUCCH component, or a combination thereof and the length may be based on a length of a sequence used to transmit uplink control messages over the first resource.

In some examples of the method, apparatuses, and non-transitory computer-readable medium described herein, the signaling further indicates a respective quantity of resources included in each PUCCH resource set of the second group, each resource corresponding to a respective set of parameters associated with transmitting uplink control messages over the resource and the uplink control message may be received in accordance with a first set of parameters corresponding to the first resource.

In some examples of the method, apparatuses, and non-transitory computer-readable medium described herein, the first set of parameters includes a starting symbol of a first slot or a first subframe, a first quantity of repetitions of the first resource in the first slot or the first subframe, a second quantity of repetitions of the first resource in a second slot or a second subframe, a starting location of a PUCCH within the starting symbol, an indication of whether data, DMRSs, time gaps, or a combination thereof, may be multiplexed on the first resource, a density of DMRSs included in the uplink control message, a percentage of signals transmitted over the first resource that may be DMRSs, a beam hopping configuration, a time hopping configuration, a cover code, or a combination thereof.

In some examples of the method, apparatuses, and non-transitory computer-readable medium described herein, the first set of parameters includes a quantity of symbols included in the first resource, a quantity of PUCCH components included in the first resource, a length of each PUCCH component, or a combination thereof.

In some examples of the method, apparatuses, and non-transitory computer-readable medium described herein, the length of each PUCCH component corresponds to a minimum time interval that includes a DMRS block, a minimum time interval that includes at least a threshold quantity of DMRS samples, or a fixed time interval that may be based on a bandwidth associated with the first resource.

In some examples of the method, apparatuses, and non-transitory computer-readable medium described herein, the first set of parameters includes a starting symbol of a first DMRS block that may be shared by a set of UEs including the UE, a starting location of the first DMRS block in the starting symbol of the first DMRS block, a length of the first DMRS block, a starting symbol of a second DMRS block that may be specific to the UE, a starting location of the second DMRS block in the starting symbol of the second DMRS block, a length of the second DMRS block, or a combination thereof.

In some examples of the method, apparatuses, and non-transitory computer-readable medium described herein, each PUCCH resource set of the first group and the second group may be associated with transmitting a respective quantity of control bits and the selected PUCCH resource set may be based on a quantity of control bits included in the uplink control message.

In some examples of the method, apparatuses, and non-transitory computer-readable medium described herein, the first type of time domain waveform corresponds to a sequence-based time domain waveform that excludes DMRSs and the second type of time domain waveform corresponds to a time domain waveform that includes one or more DMRSs.

In some examples of the method, apparatuses, and non-transitory computer-readable medium described herein, the first resource of the selected PUCCH resource set may be further indicated based on a starting location of a PDCCH within a symbol or a slot, the DCI transmitted over the PDCCH.

DETAILED DESCRIPTION

Figure 1:
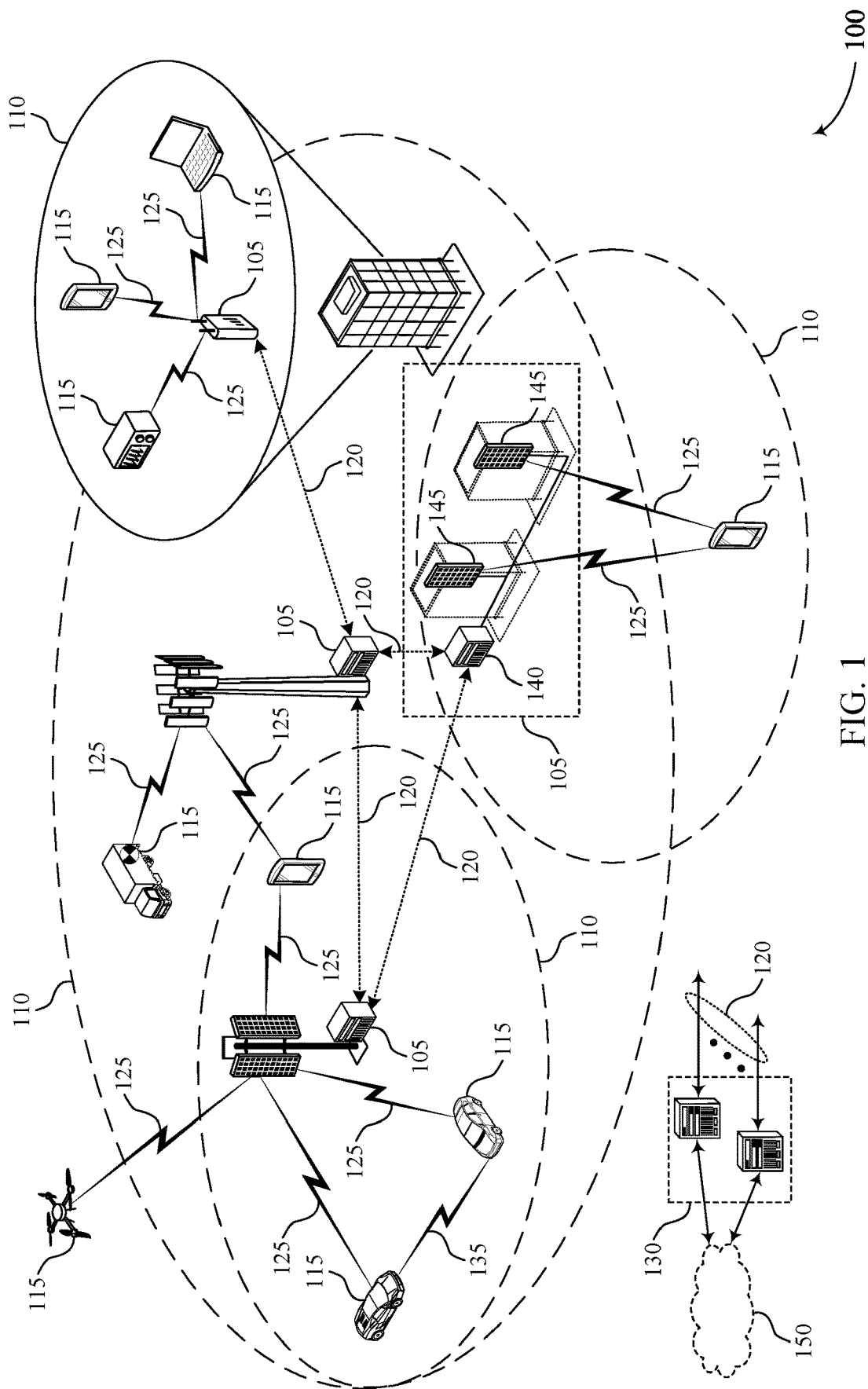
FIGS. 1 and 2 illustrate examples of wireless communications systems that support physical uplink control channel (PUCCH) resource allocation techniques in accordance with aspects of the present disclosure.

Some wireless communications systems may include communication devices, such as a UE and a base station (e.g., an eNodeB (eNB), a next-generation NodeB or a giga-NodeB, either of which may be referred to as a gNB, or some other base station), that may support multiple radio access technologies (RATs). Examples of RATs include 4G systems, such as LTE systems, and 5G systems, which may be referred to as NR systems. In some examples, a wireless communications system may support communications between communications devices (e.g., a UE, a base station) over upper frequency bands, such as millimeter wave (mmW) communications over an FR4 frequency band including frequencies up to 114 Gigahertz (GHz) or an FR5 frequency band including frequencies up to 275 GHz, among other upper frequency bands.

In some examples, a UE and a base station may support upper frequency band communications using frequency domain waveforms or time domain waveforms. For example, a UE may transmit physical uplink control channel (PUCCH) messages to a base station over an upper frequency band using a frequency domain waveform (e.g., an orthogonal frequency division multiplexing (OFDM) waveform) or a time domain waveform (e.g., a sequence-based time domain waveform, a demodulation reference signal (DMRS) based time domain waveform). In some cases, using a time domain waveform to communicate such upper frequency band communications may be more resilient to phase noise and may be less complex, and thus associated with reduced processing time, compared to using a frequency domain waveform. Additionally, in some cases, using a frequency domain waveform may increase a peak to average power ratio (PAPR) relative to using a time domain waveform, thus constraining a transmit power of the UE. Accordingly, a UE may transmit PUCCH messages using a time domain waveform to reduce processing time, increase phase noise resiliency, and reduce a PAPR associated with transmitting the PUCCH messages. However, in some cases, current configurations of PUCCH resources may be unable to support using time domain waveforms. For example, current PUCCH resource configurations may include frequency-related parameters, such as a resource block allocation or a frequency hopping configuration, among others, while excluding time-related parameters.

Techniques, systems, and devices are described herein for enabling the communication of PUCCH messages using time domain waveforms. For example, a base station may configure a UE with PUCCH resources that support the use of time domain waveforms in transmitting uplink control messages over the PUCCH resources. For instance, the base station may transmit signaling (e.g., one or more downlink control messages) to the UE that indicates a first group of PUCCH resource sets and a second group of PUCCH resource sets. The first group may include PUCCH resource sets associated with a first type of time domain waveform (e.g., a sequence-based non-coherent time domain waveform), and the second group may include PUCCH resource sets associated with a second type of time domain waveform (e.g., a DMRS based coherent time domain waveform). Additionally, each PUCCH resource set of the first group and the second group may include one or more PUCCH resources that each correspond to a respective set of parameters associated with transmitting uplink control messages using a time domain waveform (e.g., the first type or the second type). For example, each PUCCH resource may be configured with a set of time-related parameters, such as the type of time domain waveform, a quantity of PUCCH components included in the PUCCH resource, and a starting location of the PUCCH resource within a symbol, among other time-related parameters described herein.

The base station may transmit downlink control information (DCI) to the UE that indicates a type of time domain waveform for transmitting an uplink control message. The DCI may further indicate a PUCCH resource of a UE-selected PUCCH resource set to use to transmit the uplink control message. For example, in response to receiving the DCI, the UE may select a PUCCH resource set from the first group or the second group based on the type of time domain waveform indicated by the DCI (e.g., from the first group if the DCI indicates the first type, from the second group if the DCI indicates the second type) and based on a quantity of control bits to be transmitted in the uplink control message. The UE may further select the PUCCH resource that is indicated by the DCI within the selected PUCCH resource set. Using the selected PUCCH resource, the UE may transmit the uplink control message to the base station according to the indicated type of time domain waveform and the respective set of parameters associated with the selected PUCCH resource.

Aspects of the subject matter described in this disclosure may be implemented to realize one or more of the following potential improvements, among others. The techniques employed by the UE and the base station may provide benefits and enhancements to the operation of the UE and the base station. For example, operations performed by the UE and the base station may enable the communication of PUCCH messages using time domain waveforms, which may that reduce processing time, increase phase noise resiliency, and reduce a PAPR associated with transmitting the PUCCH messages. In some examples, communicating PUCCH messages using time domain waveforms may increase reliability, data rates, and spectral efficiency. In some other examples, communicating PUCCH messages using time domain waveforms may provide improvements to resource utilization, power consumption, battery life, coordination between devices, and processing capability, among other benefits.

Aspects of the disclosure are initially described in the context of wireless communications systems. Aspects of the disclosure are additionally described in the context of resource diagrams, a component diagram, and a process flow. Aspects of the disclosure are further illustrated by and described with reference to apparatus diagrams, system diagrams, and flowcharts that relate to PUCCH resource allocation techniques.

FIG. 1 illustrates an example of a wireless communications system 100 that supports PUCCH resource allocation techniques in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more RATs.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given RAT (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as OFDM or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different RATs.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support mmW communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) RAT, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The wireless communications system 100 may support the communication of uplink control messages over a PUCCH using a time domain waveform. For example, a UE 115 may support transmitting a PUCCH message using a time domain single carrier quadrature amplitude modulation (QAM) waveform, which may implement wideband symbols having short durations in the time domain rather than, for example, an OFDM waveform that implements narrowband subcarriers having long symbol durations.

The UE 115 may further support multiple types of time domain waveforms for transmitting uplink control messages. For example, the UE 115 may support a first type of time domain waveform that is a sequence-based time domain waveform that excludes (e.g., having no) DMRSs. Examples of sequences that may be used by the UE 115 to transmit a PUCCH message include a Zadoff-Chu sequence, a Gold sequence, a discrete Fourier transform (DFT) sequence, a sampled DFT sequence, a sampled Zadoff-Chu sequence, or a Hadamard sequence, among other sequences that may be used by the UE 115. In some examples, the first type of time domain waveform may be referred to as a non-coherent time domain waveform. In some examples, a non-coherent time domain waveform may indicate control information (e.g., control bits of an uplink control message) based on one or more roots of a sequence, one or more cyclic shifts of the sequence, or both. For example, different roots of different sequences may be mapped to different information such that the one or more roots of the sequence may indicate corresponding control information. Additionally, or alternatively, different cyclic shifts applied to a sequence may be mapped to different information such that the one or more cyclic shifts applied to the sequence may indicate corresponding control information. In some examples, a length of a sequence of a non-coherent time domain waveform may be based on a quantity of control bits to be communicated. For example, as the quantity of control bits to be communicated increases, the length of the sequence may increase.

Additionally, or alternatively, the UE 115 may support a second type of time domain waveform that is a sequence-based or data-based time domain waveform that includes (e.g., has) DMRSs. In some examples, the first type of time domain waveform may be referred to as a coherent time domain waveform. In some implementations, a coherent time domain waveform may include one or more data blocks (e.g., that include one or more data samples), one or more DMRS blocks (e.g., that include one or more DMRS samples), or a combination thereof, to communicate control information included in an uplink control message. In some examples, the one or more data blocks and the one or more DMRS blocks may be multiplexed inside a same PUCCH symbol. In some other examples, the one or more data blocks may be separate from the one or more DMRS blocks. In some implementations, coherent time domain waveforms may support relatively longer PUCCH transmissions compared to non-coherent time domain waveforms, for example, based on including DMRSs that enable channel estimation.

Various aspects of the described techniques support PUCCH resource configuration and allocation such that a UE 115 may transmit uplink control messages using time domain waveforms over PUCCH resources. For example, a base station 105 may configure a UE 115 with PUCCH resources that support the use of time domain waveforms in transmitting uplink control messages over the PUCCH resources. For instance, a PUCCH resource configuration indicated by the base station 105 may include sets of time-related parameters that indicate various PUCCH resource allocations, such as a type of time domain waveform associated with a given PUCCH resource, a quantity of PUCCH components included in the given PUCCH resource, a length of each PUCCH component, and a starting location of the given PUCCH resource within a symbol, among other time-related parameters described herein.

The base station 105 may configure the UE 115 with a group of non-coherent PUCCH resource sets and a group of coherent PUCCH resource sets. Additionally, the base station 105 may transmit DCI to the UE 115 to indicate the type of PUCCH resource set to use (e.g., a coherent PUCCH resource set or a non-coherent PUCCH resource set) and a PUCCH resource within the PUCCH resource set to use to transmit an uplink control message. In response to receiving the DCI, the UE 115 may select a PUCCH resource set from the group of coherent PUCCH resource sets or the group of non-coherent PUCCH resource sets based on the indicated type and a quantity of control bits to be transmitted in the uplink control message. The UE 115 may also select the PUCCH resource within the UE-selected PUCCH resource set indicated by the DCI and may transmit the uplink control message to the base station 105 using the selected PUCCH resource and in accordance with the type of time domain waveform and the time-related parameters associated with the selected PUCCH resource.

Figure 2:
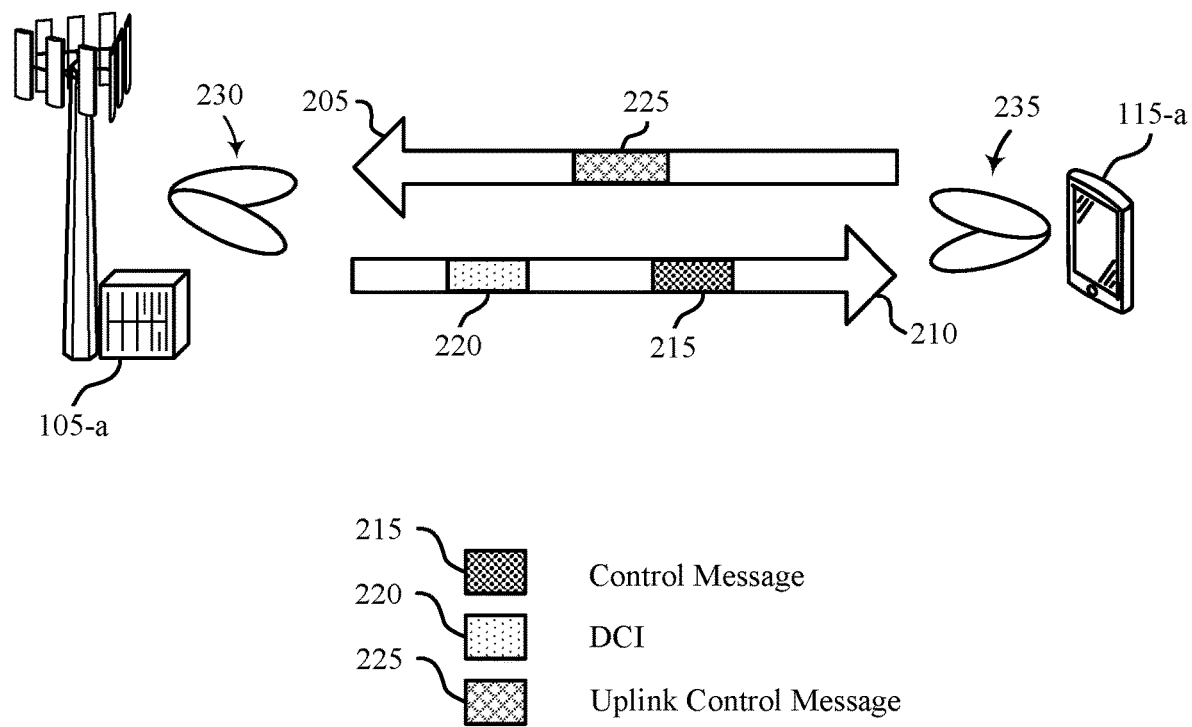

FIG. 2 illustrates an example of a wireless communications system 200 that supports PUCCH resource allocation techniques in accordance with aspects of the present disclosure. The wireless communications system 200 may implement or be implemented by aspects of the wireless communications system 100. For example, the wireless communications system 200 may include a base station 105-a and a UE 115-a which may be examples of the corresponding devices described with reference to FIG. 1. In some aspects, the wireless communications system 200 may support multiple RATs including 4G systems and 5G systems which may be referred to as NR systems. The wireless communications system 200 may support the configuration and allocation of PUCCH resources that support the use of time domain waveforms for transmitting uplink control messages.

The wireless communications system 200 may support communications between the UE 115-a and the base station 105-a. For example, the UE 115-a may transmit uplink messages to the base station 105-a over a communication link 205 (which may be an example of a communication link 125 described with reference to FIG. 1) and may receive downlink messages on a communication link 210 (which may be an example of a communication link 125). The wireless communications system 200 may additionally support beamformed communications between the base station 105-a and the UE 115-a. For example, the base station 105-a may transmit and receive messages using one or more of a set of base station beams 230, and the UE 115-*a* may transmit and receive messages using one or more of a set of UE beams 235.

The base station 105-*a* and the UE 115-*a* may support communicating PUCCH transmissions using a time domain waveform, such as a non-coherent time domain waveform or a coherent time domain waveform. For example, the UE 115-*a* may transmit an uplink control message 225 to the base station 105-*a* using a time domain waveform, for example, rather than a frequency domain waveform such as an OFDM waveform.

The UE 115-*a* may transmit the uplink control message 225 over a PUCCH and using a PUCCH resource configured by the base station 105-*a*. The base station 105-*a* may configure and allocate the PUCCH resource such that the UE 115-*a* may transmit the uplink control message 225 over the PUCCH resource using the time domain waveform. For example, the base station 105-*a* may transmit one or more control messages 215 (e.g., via RRC signaling) to the UE 115-*a* that indicate (e.g., configure) PUCCH resource sets that support time domain waveform PUCCH transmissions. For instance, the one or more control messages 215 may indicate a first group of non-coherent PUCCH resource sets and a second group of coherent PUCCH resources sets. That is, the first group may include PUCCH resource sets that support the use of non-coherent time domain waveforms for transmitting uplink control messages 225, and the second group may include PUCCH resource sets that support the use of coherent time domain waveform for transmitting uplink control messages 225.

Each PUCCH resource set of the first group and the second group may include one or more PUCCH resources that are each associated with (e.g., configured with) different sets of parameters for transmitting uplink control messages 225 using time domain waveforms (e.g., time-related parameters). For example, each PUCCH resource included in a non-coherent PUCCH resource set may be associated with a respective set of non-coherent parameters as described herein, including with reference to FIGS. 3 through 5, and each PUCCH resource included in a coherent PUCCH resource set may be associated with a respective set of coherent parameters as described herein, including with reference to FIGS. 3, 4, and 6. In some examples, the one or more control messages 215 may configure each of the PUCCH resources included in the PUCCH resource sets of the first group and the second group. For example, the one or more control messages 215 may indicate the respective sets of parameters associated with each PUCCH resource.

The base station 105-*a* may transmit DCI 220 to the UE 115-*a* to prompt the transmission of the uplink control message 225 by the UE 115-*a*. For example, the DCI 220 may the type of PUCCH resource set from which the UE 115-*a* is to select a PUCCH resource for transmitting the uplink control message 225 (e.g., from a non-coherent PUCCH resource set or a coherent PUCCH resource set). For instance, the DCI 220 may indicate the type of time domain waveform that the UE 115-*a* is to use in transmitting the uplink control message 225, such as indicating for the UE 115-*a* to use a non-coherent time domain waveform or a coherent time domain waveform.

Accordingly, the UE 115-*a* may select a PUCCH resource set from the first group of non-coherent PUCCH resource sets or the second group of coherent PUCCH resource sets in accordance with the indicated type of PUCCH resource set. The UE 115-*a* may further select the PUCCH resource set within the first group of non-coherent PUCCH resource sets or the second group of coherent PUCCH resource sets based on a quantity of control bits included (e.g., to be transmitted) in the uplink control message 225. For example, each PUCCH resource set within the first group and the second group may be associated with transmitting a respective quantity of control bits. Accordingly, the UE 115-*a* may select the PUCCH resource set corresponding to the quantity of control bits included in the uplink control message 225 and within the first group or the second group based on the type of PUCCH resource set indicated by the DCI 220.

The DCI 220 may further indicate the PUCCH resource that the UE 115-*a* is to use within the UE-selected PUCCH resource set. For example, the DCI 220 may indicate (e.g., include) an index of the PUCCH resource within the PUCCH resource set selected by the UE 115-*a*. For instance, the DCI 220 may indicate for the UE 115-*a* to select the PUCCH resource having an index of 0 (e.g., or 1, 2, 3, and so on) within the PUCCH resource set selected by the UE 115-*a*. In some examples, the DCI 220 may include a PUCCH resource indicator field that indicates the type of PUCCH resource set and the PUCCH resource. In some cases, the PUCCH resource indicator field may include a fixed quantity of bits. In some examples, the DCI 220 may indicate the PUCCH resource within the UE-selected PUCCH resource set based on a starting location of a physical downlink control channel (PDCCH) within a symbol or a slot, where the DCI 220 is transmitted over the PDCCH. For example, the starting location of the PDCCH within the symbol or slot may map to a PUCCH resource (e.g., may correspond to an index of a PUCCH resource) within a PUCCH resource set. In some examples, the starting location of the PDCCH may be used to indicate the PUCCH resource in conjunction with the PUCCH resource indicator field included in the DCI 220, for example, if a quantity of PUCCH resources included in the UE-selected PUCCH resource exceeds a quantity of PUCCH resource indexes that may be indicated by the fixed quantity of bits of the PUCCH resource indicator field.

Therefore, in response to receiving the DCI 220, the UE 115-*a* may select a PUCCH resource set from the first group or the second group and may select (e.g., identify, determine) a PUCCH resource within the selected PUCCH set corresponding to the PUCCH resource indicated by the DCI 220. The UE 115-*a* may transmit the uplink control message 225 to the base station 105-*a* using the PUCCH resource and in accordance with the type of time domain waveform indicated by the DCI 220 and the set of parameters corresponding to the PUCCH resource. For example, the UE 115-*a* may transmit the uplink control message 225 over the PUCCH resource using a non-coherent time domain waveform and according to a set of non-coherent parameters corresponding to the PUCCH resource or using a coherent time domain waveform and according to a set of coherent parameters corresponding to the PUCCH resource.

Figure 3:
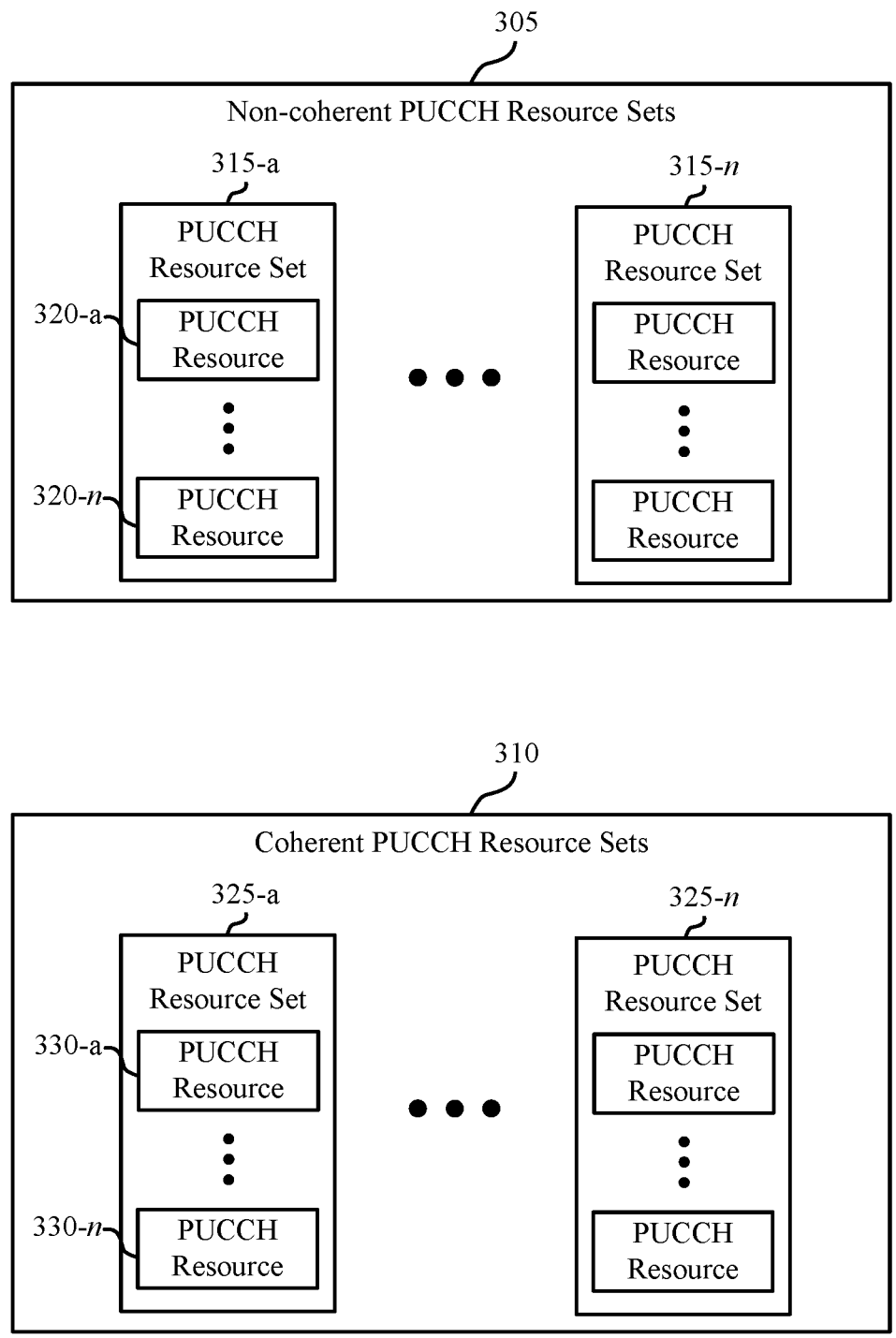
FIG. 3 illustrates an example of a resource diagram that supports PUCCH resource allocation techniques in accordance with aspects of the present disclosure.

FIG. 3 illustrates an example of a resource diagram 300 that supports PUCCH resource allocation techniques in accordance with aspects of the present disclosure. The resource diagram 300 may implement or be implemented by aspects of the wireless communications systems 100 and 200 as described with reference to FIGS. 1 and 2, respectively. For example, the resource diagram 300 may be implemented by a UE 115 and a base station 105 to support the configuration and allocation of PUCCH resources that support the use of time domain waveforms for transmitting uplink control messages.

The resource diagram 300 depicts a group of non-coherent PUCCH resource sets 305 and a group of coherent PUCCH resource sets 310. Each of the group of non-coherent PUCCH resource sets 305 and the group of coherent PUCCH resource sets 310 may be indicated (e.g., configured) by a base station 105 to a UE 115, for example, via one or more control messages transmitted via RRC signaling.

The group of non-coherent PUCCH resource sets 305 may include PUCCH resource sets 315. For example, the group of non-coherent PUCCH resource sets 305 may include a PUCCH resource set 315-*a* through a PUCCH resource sets 315-*n*. The PUCCH resource sets 315 may be examples of sets of non-coherent PUCCH resources. That is, each PUCCH resource set 315 may include one or more PUCCH resources 320 that support the transmission of uplink control messages using a non-coherent time domain waveform. For example, the PUCCH resource set 315-*a* may include a PUCCH resource 320-*a* through a PUCCH resource 320-*n* that may each be used by the UE 115 to transmit an uplink control message using a non-coherent time domain waveform.

Each PUCCH resource set 315 may be associated with transmitting a respective quantity of control bits in an uplink control message. In some examples, each respective quantity of control bits may span a range of control bits. For example, the PUCCH resource set 315-*a* may be associated with transmitting up to two control bits, a second PUCCH resource set 315 (not shown) may be associated with transmitting three or four control bits, a third PUCCH resource set 315 (not shown) may be associated with transmitting five to twelve control bits, and so on up through the PUCCH resource set 315-*n* (e.g., although any other quantities of control bits are possible). In other words, the PUCCH resources 320 of the PUCCH resource set 315-*a* may be used by the UE 115 to transmit up to two control bits, PUCCH resources 320 included in the second PUCCH resource set 315 may be used to transmit three or four control bits, and so on.

The group of coherent PUCCH resource sets 310 may include PUCCH resource sets 325. For example, the group of coherent PUCCH resource sets 310 may include a PUCCH resource set 325-*a* through a PUCCH resource sets 325-*n*. The PUCCH resource sets 325 may be examples of sets of coherent PUCCH resources. That is, each PUCCH resource set 325 may include one or more PUCCH resources 330 that support the transmission of uplink control messages using a coherent time domain waveform. For example, the PUCCH resource set 325-*a* may include a PUCCH resource 330-*a* through a PUCCH resource 330-*n* that may each be used by the UE 115 to transmit an uplink control message using a non-coherent time domain waveform.

Each PUCCH resource set 325 may be associated with transmitting a respective quantity of control bits in an uplink control message. In some examples, each respective quantity of control bits may span a range of control bits. For example, the PUCCH resource set 325-*a* may be associated with transmitting up to two control bits, a second PUCCH resource set 325 (not shown) may be associated with transmitting three or four control bits, a third PUCCH resource set 325 (not shown) may be associated with transmitting five to twelve control bits, and so on up through the PUCCH resource set 325-*n* (e.g., although any other quantities of control bits are possible). In other words, the PUCCH resources 330 of the PUCCH resource set 325-*a* may be used by the UE 115 to transmit up to two control bits, PUCCH resources 330 included in the second PUCCH resource set 325 may be used to transmit three or four control bits, and so on.

A PUCCH resource 320 and a PUCCH resource 330 may indicate the time-frequency resource position and allocation for a UE 115 to use in transmitting a PUCCH. Different PUCCH resources 320 and PUCCH resources 330 may indicate different time-frequency resource positions and allocations, for example, in the form of different sets of parameters configured for each respective PUCCH resource 320 and PUCCH resource 330. Accordingly, the base station 105 may control (e.g., schedule, allocate) the over-the-air resources used for PUCCH transmissions via the DCI transmissions that indicate which PUCCH resource 320 or PUCCH resource 330 to use for the PUCCH transmissions.

The UE 115 may select a PUCCH resource set 315 or a PUCCH resource set 325 based on DCI transmitted by the base station 105 and a quantity of control bits to be transmitted in an uplink control message. For example, the DCI may indicate a type of PUCCH resource set for the UE 115 to select, such as indicating for the UE 115 to select a non-coherent PUCCH resource set or a coherent PUCCH resource set. In accordance with the indicated type of PUCCH resource set, the UE 115 may select a PUCCH resource set 315 or a PUCCH resource set 325 that corresponds to the quantity of control bits to be transmitted. For example, if the DCI indicates a non-coherent PUCCH resource set type and the quantity of control bits to be transmitted is two (e.g., as indicated by the DCI), the UE 115 may select the PUCCH resource set 315-*a* from which to select and use a PUCCH resource 320 for transmitting the uplink control message. For example, the DCI may further indicate a PUCCH resource of a UE-selected PUCCH resource set, such as indicating an index of the PUCCH resource, among other examples described herein. Accordingly, if the DCI further indicates a PUCCH resource index of zero, the UE 115 may select and use the PUCCH resource 320-*a* from the PUCCH resource set 315-*a* to use to transmit the uplink control message. Alternatively, if the DCI indicates a coherent PUCCH resource set type, a PUCCH resource index of zero, and a quantity of control bits to be transmitted of two, the UE 115 may select the PUCCH resource 330-*a* from the PUCCH resource set 325-*a* to use to transmit the uplink control message.

Figure 4A:
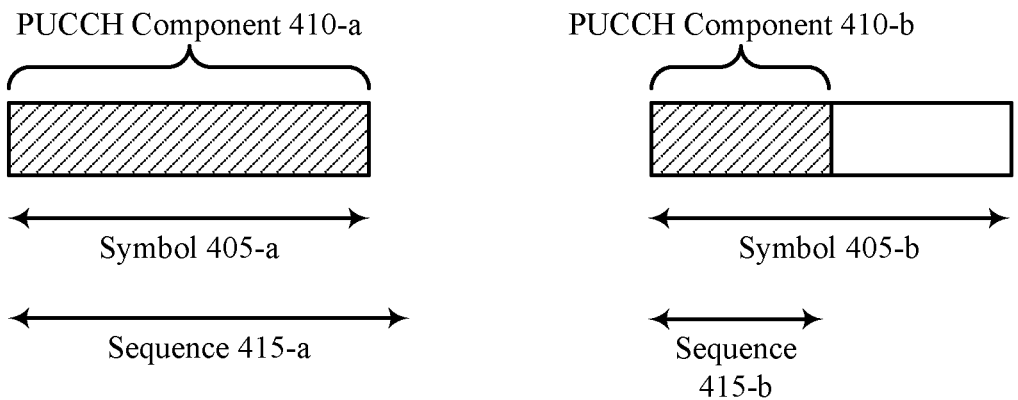
FIGS. 4A & 4B illustrate an example of a component diagram that supports PUCCH resource allocation techniques in accordance with aspects of the present disclosure.

FIG. 4A illustrates an example of a component diagram 400-*a* that supports PUCCH resource allocation techniques in accordance with aspects of the present disclosure. The component diagram 400 may implement or be implemented by aspects of the wireless communications systems 100 and 200 as described with reference to FIGS. 1 and 2, respectively. For example, component diagram 400 may be implemented by a UE 115 and a base station 105 to support the configuration and allocation of PUCCH resources that support the use of time domain waveforms for transmitting uplink control messages.

The component diagram 400-*a* depicts examples of PUCCH components 410 associated with transmitting uplink control messages using non-coherent time domain waveforms. For example, the component diagram 400-*a* depicts a PUCCH component 410-*a* and a PUCCH component 410-*b* that may be used to transmit uplink control messages using non-coherent time domain waveforms. For instance, a non-coherent PUCCH resource may include a combination of one or more PUCCH components 410, where a PUCCH component 410 may correspond to a smallest signaling block in time that supports the transmission of an uplink control message in accordance with time-related parameters configured for the non-coherent PUCCH resource.

A length of a PUCCH component 410 may be based on (e.g., derived from) a length of a sequence 415 used to transmit an uplink control message. In some examples, the length of the PUCCH component 410 may depend on whether the sequence 415 is longer than a length of a symbol 405. For example, a length of a sequence 415-a used to transmit an uplink control message over a symbol 405-a may be greater than or equal to a length of the symbol 405-a. Here, the length of the PUCCH component 410-a may correspond to (e.g., equal) the length of the symbol 405-a. In some examples, the length of the PUCCH component 410 may correspond to the length of the sequence 415. For example, a length of a sequence 415-b used to transmit an uplink control message over a symbol 405-b may be less than a length of the symbol 405-b. Here, the length of the PUCCH component 410-b may correspond to (e.g., equal) the length of the sequence 415-b.

Figure 4B:
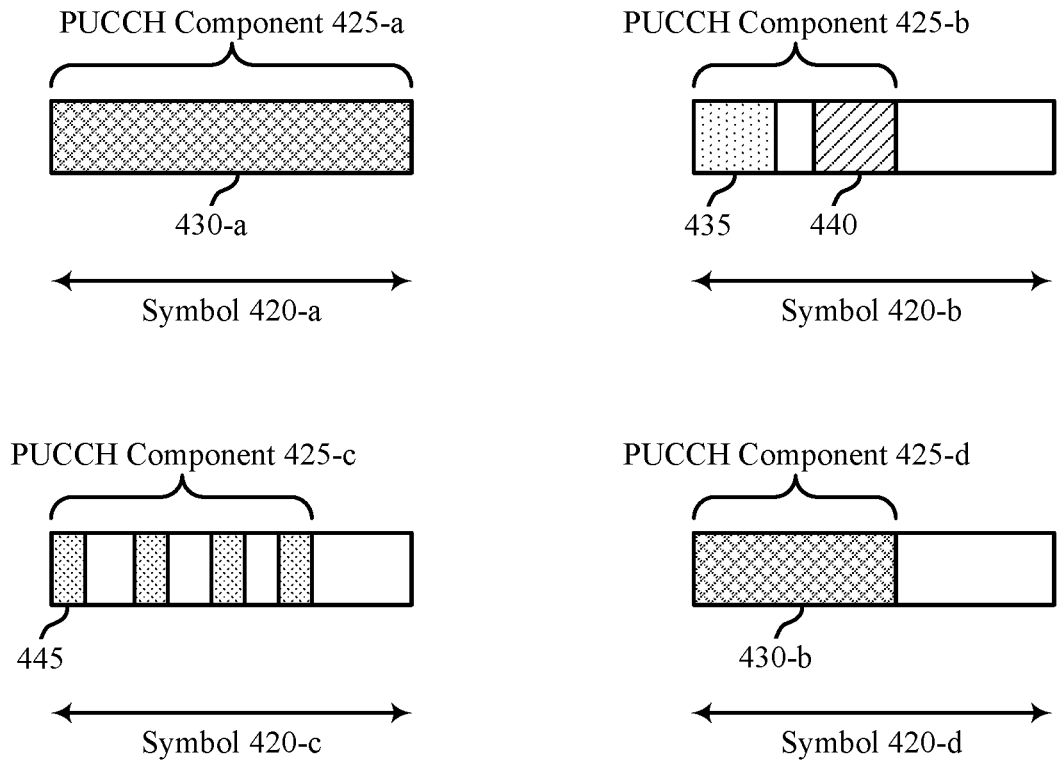

FIG. 4B illustrates an example of a component diagram 400-b that supports PUCCH resource allocation techniques in accordance with aspects of the present disclosure. The component diagram 400 may implement or be implemented by aspects of the wireless communications systems 100 and 200 as described with reference to FIGS. 1 and 2, respectively. For example, component diagram 400 may be implemented by a UE 115 and a base station 105 to support the configuration and allocation of PUCCH resources that support the use of time domain waveforms for transmitting uplink control messages.

The component diagram 400-b depicts examples of PUCCH components 425 associated with transmitting uplink control messages using coherent time domain waveforms. For example, the component diagram 400-b depicts a PUCCH component 425-a, a PUCCH component 425-b, a PUCCH component 425-c, and a PUCCH component 425-d that may be used to transmit uplink control messages using coherent time domain waveforms. For instance, a coherent PUCCH resource may include a combination of one or more PUCCH components 425, where a PUCCH component 425 may correspond to a smallest signaling block in time that supports the transmission of an uplink control message in accordance with time-related parameters configured for the coherent PUCCH resource.

In some examples, a length of a PUCCH component 425 may correspond to a length of a symbol 420. For example, a length of the PUCCH component 425-a may correspond to (e.g., equal) a length of a symbol 420-a. The PUCCH component 425-a may include information 430-a that includes any combination of desired signals, such as including data, one or more DMRSs, one or more phase tracking reference signals (PTRSs), or a combination thereof.

In some examples, a length of a PUCCH component 425 may correspond to a minimum contiguous time interval (e.g., a smallest contiguous signaling block) that includes a DMRS block 435 of some fixed length (e.g., a block of one or more DMRSs). For example, a length of the PUCCH component 425-b may correspond to a minimum contiguous time interval that includes the DMRS block 435 and a data block 440, which may be less than a length of a symbol 420-b.

In some examples, a length of a PUCCH component 425 may correspond to a minimum contiguous time interval (e.g., a smallest contiguous signaling block) that includes at least a threshold quantity of DMRSs 445 (e.g., DMRS samples). For example, DMRSs 445 may distributed within a symbol 420 (e.g., rather than transmitted in a DMRS block 435). For instance, DMRSs 445 transmitted over a symbol 420-c may be distributed (e.g., separated in time from each other) within the symbol 420-c. Here, a length of the PUCCH component 425-c may correspond to a length of a contiguous signaling block that includes at least the threshold quantity of DMRSs 445 (e.g., four DMRSs 445).

In some examples, a length of a PUCCH component 425 may be based on a bandwidth spanned by a coherent PUCCH resource. For example, as a bandwidth of the coherent PUCCH resource decreases, the length of the PUCCH component 425 may decrease, and vice versa. In some examples, the length of the PUCCH component 425 may be a fixed time interval based on the bandwidth. For example, coherent PUCCH resources having relatively lower bandwidths may include PUCCH components 425 having lengths equal to half a length of a symbol 420, and coherent PUCCH resources having relatively higher bandwidths may include PUCCH components 425 having lengths equal to a length of a symbol 420. For instance, the PUCCH component 425-d may include information 430-b, and a length of the PUCCH component 425-d may correspond to half a length of a symbol 420-d based on a bandwidth of a coherent PUCCH resource being relatively low.

Figure 5:
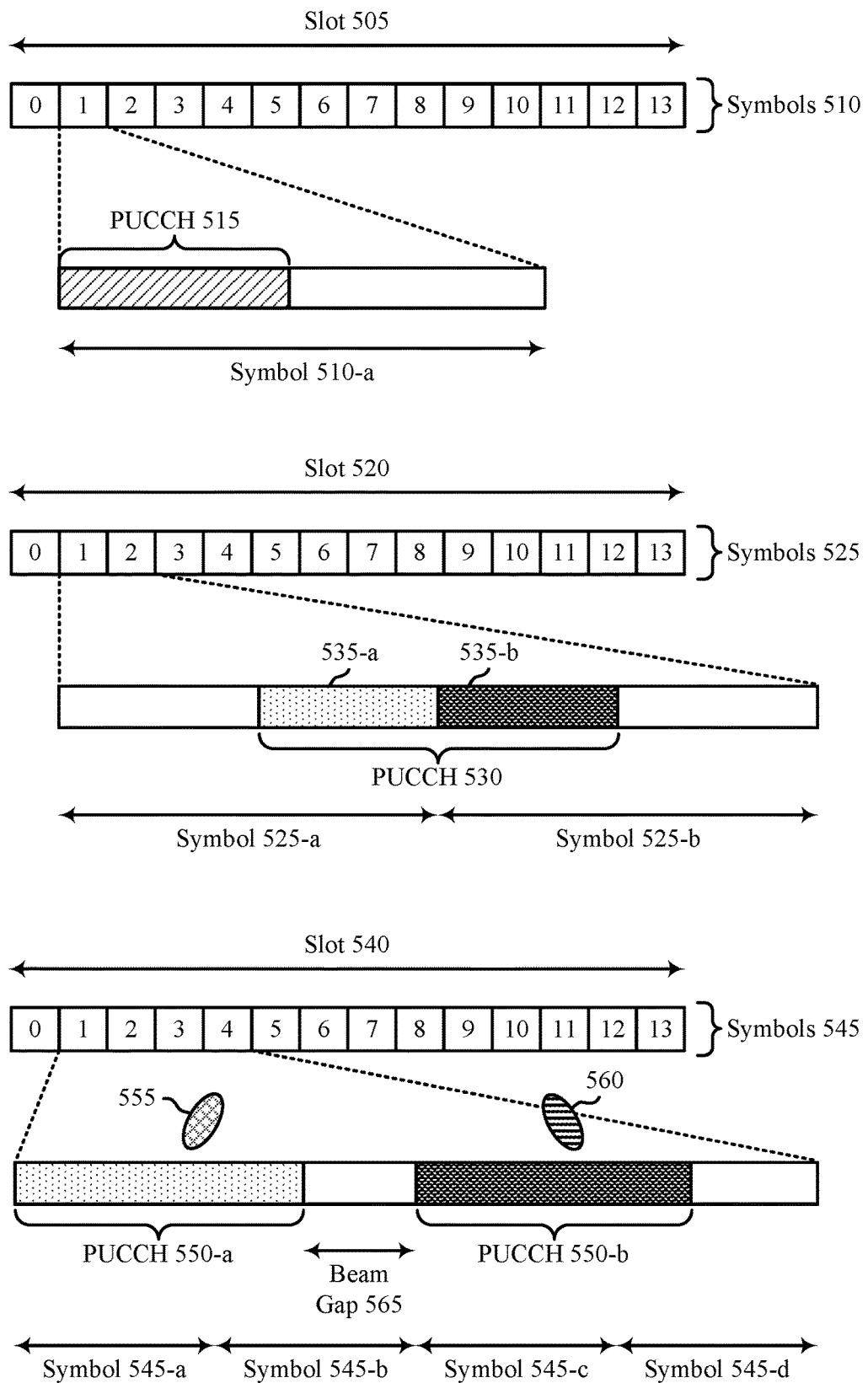
FIGS. 5 and 6 illustrate examples of resource diagrams that support PUCCH resource allocation techniques in accordance with aspects of the present disclosure.

FIG. 5 illustrates an example of a resource diagram 500 that supports PUCCH resource allocation techniques in accordance with aspects of the present disclosure. The resource diagram 500 may implement or be implemented by aspects of the wireless communications systems 100 and 200 as described with reference to FIGS. 1 and 2, respectively. For example, resource diagram 500 may be implemented by a UE 115 and a base station 105 to support the configuration and allocation of PUCCH resources that support the use of time domain waveforms for transmitting uplink control messages.

The resource diagram 500 depicts various examples of non-coherent PUCCH resources configured with various combinations of time-related parameters. For example, a configuration for a non-coherent PUCCH resource may include a set of non-coherent parameters associated with transmitting an uplink control message over the non-coherent PUCCH resource using a non-coherent time domain waveform. In some examples, the set of non-coherent parameters may include a starting symbol of the non-coherent PUCCH resource in a first slot or a first subframe; a first quantity of repetitions of the non-coherent PUCCH resource in the first slot or the first subframe; a second quantity of repetitions of the non-coherent PUCCH resource in a second slot or a second subframe; a quantity of symbols included in the non-coherent PUCCH resource; a quantity of PUCCH components included in the non-coherent PUCCH resource; a length of a (e.g., each) PUCCH component included in the non-coherent PUCCH resource; a starting location of the non-coherent PUCCH resource within the starting symbol; a type of sequence for transmitting the uplink control message; an indication of whether to use one or more cyclic shifts, one or more roots of a sequence, or both, to indicate information included in the uplink control message; a beam hopping configuration; a time hopping configuration; a cover code; or a combination thereof.

In a first example, a first non-coherent PUCCH resource may be configured with a first set of non-coherent parameters for transmitting a first uplink control message in a slot 505. The slot 505 may include a quantity of symbols 510. For example, the slot 505 may include 14 symbols 510 indexed 0 through 13. The first set of non-coherent parameters may include a first format index, a starting symbol 510 of the first non-coherent PUCCH resource in the slot 505, a starting location of the first non-coherent PUCCH resource in the starting symbol 510, a quantity of PUCCH components included in the first non-coherent PUCCH resource, a length of each PUCCH component, and an indication to use one or more roots of a sequence to indicate information included in the first uplink control message. For example, the first non-coherent PUCCH resource may be configured with the first set of non-coherent parameters as depicted in Table 1 below.

TABLE 1

| Format Index | 0 |
|---|---|
| Starting symbol in slot | 1 |
| Starting location in symbol | 0 |
| Quantity of PUCCH components | 1 |
| Length of PUCCH component | ½ symbol |
| Shifts or Roots | Roots |

The first format index may indicate the type of sequence for a UE 115 to use to transmit the uplink control message. For example, as shown in Table 1, the first format index may have a value of 0 (e.g., or some other value), which may indicate for the UE 115 to use a DFT sequence (e.g., or some other type of sequence) to transmit the first uplink control message. The starting symbol 510 may correspond to the symbol 510-*a*, which may be the symbol 510 of the slot 505 with index 1, and the starting location in the starting symbol 510 may be 0, thereby indicating that the first non-coherent PUCCH resource starts at the beginning of the symbol 510-*a*. The quantity of PUCCH components included in the first non-coherent PUCCH resource may be one, and the length of the PUCCH component may be half a length of a symbol 510. Accordingly, to transmit the first uplink control message over the first non-coherent PUCCH resource in accordance with the first set of non-coherent parameters, the UE 115 may transmit the first uplink control message over a PUCCH 515 that starts at the beginning of the symbol 510-*a* and using a DFT sequence and one or more roots of the DFT sequence to indicate information included in the first uplink control message.

In a second example, a second non-coherent PUCCH resource may be configured with a second set of non-coherent parameters for transmitting a second uplink control message in a slot 520. The slot 520 may include a quantity of symbols 525. For example, the slot 520 may include 14 symbols 525 indexed 0 through 13. The second set of non-coherent parameters may include a second format index, a starting symbol 525 of the second non-coherent PUCCH resource in the slot 520, a starting location of the second non-coherent PUCCH resource in the starting symbol 525, a quantity of PUCCH components included in the second non-coherent PUCCH resource, a length of each PUCCH component, an indication to use both roots of a sequence and cyclic shifts applied to the sequence to indicate information included in the second uplink control message, and a cover code to apply to (e.g., multiply with) the sequence to support code division multiplexing such that multiple UEs may transmit messages over same time and frequency resources. For example, the second non-coherent PUCCH resource may be configured with the second set of non-coherent parameters as depicted in Table 2 below.

TABLE 2

| Format Index | 1 |
|---|---|
| Starting symbol in slot | 1 |
| Starting location in symbol | ½ symbol |
| Quantity of PUCCH components | 2 |

TABLE 2-continued

| Length of PUCCH component | ½ symbol |
|---|---|
| Shifts or Roots | Both |
| Cover Code | [1, −1] |

The second format index may indicate the type of sequence for a UE 115 to use to transmit the uplink control message. For example, as shown in Table 2, the second format index may have a value of 1 (e.g., or some other value), which may indicate for the UE 115 to use a Zadoff-Chu sequence (e.g., or some other type of sequence) to transmit the second uplink control message. The starting symbol 525 may correspond to the symbol 525-*a*, which may be the symbol 525 of the slot 520 with index 1, and the starting location in the starting symbol 525 may be half of a length of the starting symbol 525, thereby indicating that the second non-coherent PUCCH resource starts at the midpoint (e.g., halfway point) of the symbol 525-*a* in time. The quantity of PUCCH components included in the second non-coherent PUCCH resource may be two, and the length of the PUCCH component may be half of a length of a symbol 525. The cover code for code division multiplexing may be [1, −1]. Accordingly, to transmit the second uplink control message over the second non-coherent PUCCH resource in accordance with the second set of non-coherent parameters, the UE 115 may transmit the second uplink control message over a PUCCH 530 that starts at the midpoint of the symbol 525-*a*. The PUCCH 530 may include two PUCCH components 535 (e.g., a PUCCH component 535-*a* and a PUCCH component 535-*b*). The UE 115 may use a Zadoff-Chu sequence to generate the second uplink control message (e.g., a first Zadoff-Chu sequence for the PUCCH component 535-*a* and the first Zadoff-Chu sequence repeated for the PUCCH component 535-*b*). The UE 115 may also use one or more roots of the Zadoff-Chu sequence and may apply one or more cyclic shifts to the Zadoff-Chu sequence to indicate information included in the second uplink control message. Additionally, the UE 115 may apply the [1, −1] cover code to the Zadoff-Chu sequence, for example, by multiplying the PUCCH component 535-*a* by 1 and the PUCCH component 535-*b* by −1.

In a third example, a third non-coherent PUCCH resource may be configured with a third set of non-coherent parameters for transmitting a third uplink control message in a slot 540. The slot 540 may include a quantity of symbols 545. For example, the slot 540 may include 14 symbols 545 indexed 0 through 13. The third set of non-coherent parameters may include a third format index, a starting symbol 545 of the third non-coherent PUCCH resource in the slot 540, a starting location of the third non-coherent PUCCH resource in the starting symbol 545, a quantity of symbols included in a PUCCH 550 transmitted over the third non-coherent PUCCH resource, a quantity of PUCCH components included in the PUCCH 550, a length of each PUCCH component, an indication to use cyclic shifts applied to the sequence to indicate information included in the third uplink control message, a beam hopping configuration associated with transmitting the third uplink control message, and a time hopping configuration associated with transmitting the third uplink control message. For example, the third non-coherent PUCCH resource may be configured with the third set of non-coherent parameters as depicted in Table 3 below.

TABLE 3

| | |
|---|---|
| Format Index | 2 |
| Starting symbol in slot | 1 |
| Starting location in symbol | 0 |
| Quantity of symbols | 1 |
| Quantity of PUCCH components | 1 |
| Length of PUCCH component | ½ symbol |
| Shifts or Roots | Shifts |
| Beam for Hop 1 | Beam 555 |
| Beam Gap | ½ symbol |
| Beam for Hop 2 | Beam 560 |
| Reuse PUCCH Parameters for Hop 2 | Yes |
| Time Hop | None |

The third format index may indicate the type of sequence for a UE 115 to use to transmit the uplink control message. For example, as shown in Table 3, the third format index may have a value of 2 (e.g., or some other value), which may indicate for the UE 115 to use a sampled DFT sequence (e.g., or some other type of sequence) to transmit the third uplink control message. The starting symbol 545 may correspond to the symbol 545-*a*, which may be the symbol 545 of the slot 540 with index 1, and the starting location in the starting symbol 545 may be 0, thereby indicating that the third non-coherent PUCCH resource starts at the beginning of the symbol 545-*a*. The quantity of symbols included in a PUCCH 550 may be 1, the quantity of PUCCH components included in the PUCCH 550 may be 1, and the length of the PUCCH component may be half of a length of a symbol 545. Here, the length of the PUCCH component may indicate the additional length of the PUCCH 550 beyond the quantity of symbols included in the PUCCH 550. Accordingly, a length of the PUCCH 550 may be one and a half symbols 545. The beam hopping configuration may indicate that that the UE 115 is to use a beam 555 to transmit a first PUCCH 550-*a* over the third non-coherent PUCCH resource and a beam 560 to transmit a second PUCCH 550-*b* over the third non-coherent PUCCH resource. The beam hopping configuration may further indicate a duration of a beam gap 565 between the first PUCCH 550-*a* and the second PUCCH 550-*a* to be half of a symbol 545 in order to enable the UE 115 to switch from the beam 555 to the beam 560. The beam hopping configuration may further indicate that the UE 115 is to reuse the indicated non-coherent parameters after the beam hop to transmit the second PUCCH 550-*b*. The time hopping configuration may indicate that time hopping is not configured within a PUCCH 550. In some examples, if time hopping is configured, the time hopping configuration may indicate a time hop within a PUCCH 550, such as a time hop from within a symbol 545 or a time hope from a first symbol 545 to a second symbol 545.

Accordingly, to transmit the third uplink control message over the third non-coherent PUCCH resource in accordance with the third set of non-coherent parameters, the UE 115 may transmit the third uplink control message over the PUCCH 550-*a* using the beam 555 and the PUCCH 550-*b* using the beam 560, where the PUCCH 550-*a* may start at the beginning of the symbol 545-*a* and may end halfway through the symbol 545-*b* and the PUCCH 550-*b* may start at the beginning of the symbol 545-*c* and may end halfway through the symbol 545-*d* based on beginning after beam gap 565 and reusing the non-coherent parameters. The UE 115 may use a sampled DFT sequence to generate the third uplink control message (e.g., a first sampled DFT sequence for the PUCCH 550-*a* and the first sampled DFT sequence repeated for the PUCCH 550-*b*) and may apply one or more cyclic shifts to the sampled DFT sequence to indicate information included in the third uplink control message.

It is noted that, for illustrative purposes, the first, second, and third non-coherent PUCCH resources are depicted with the respective sets of non-coherent parameters. However, the techniques described herein may be adapted an applied to cover configuring a non-coherent PUCCH resource with any combination of non-coherent parameters.

Figure 6:
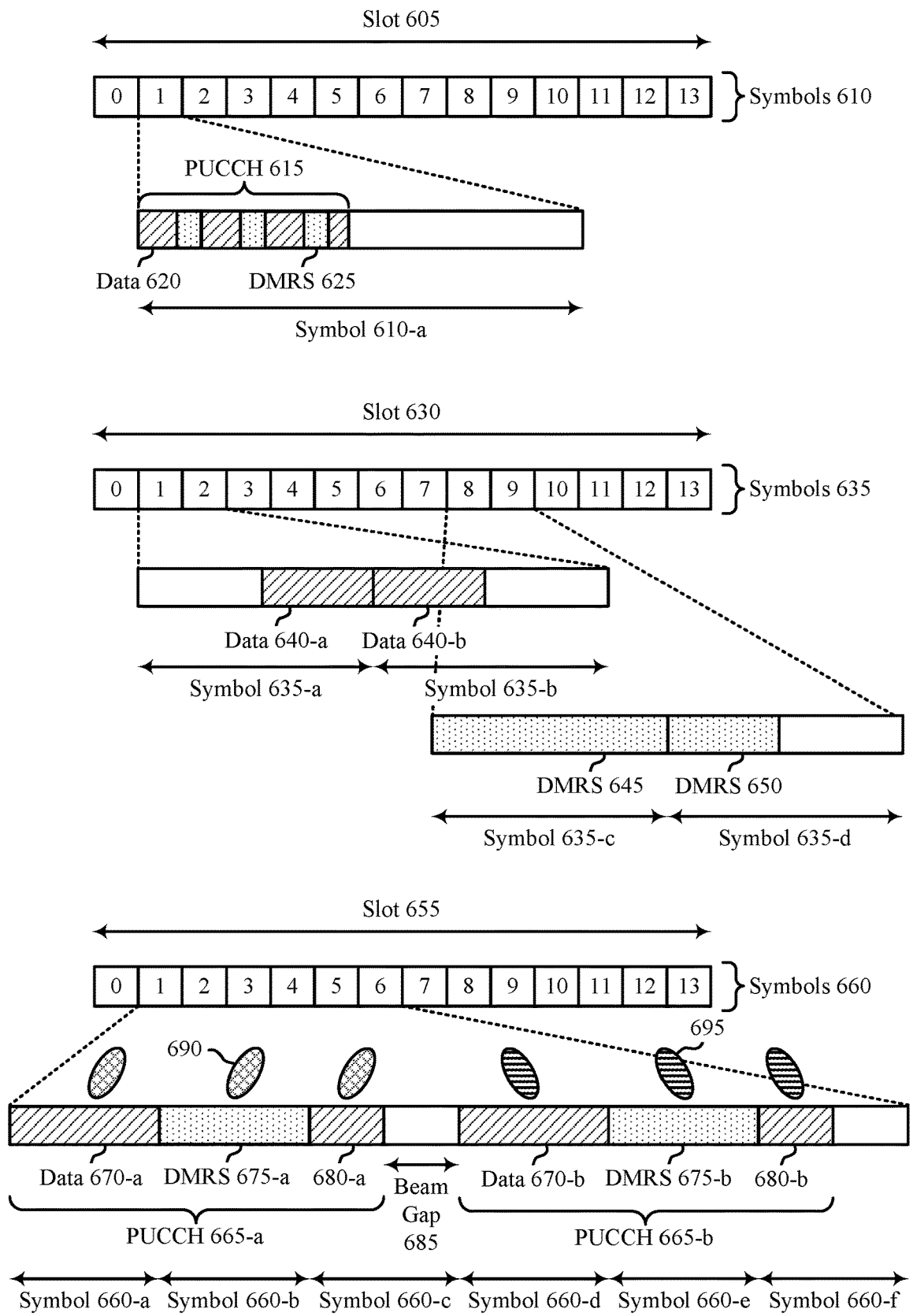

FIG. 6 illustrates an example of a resource diagram 600 that supports PUCCH resource allocation techniques in accordance with aspects of the present disclosure. The resource diagram 600 may implement or be implemented by aspects of the wireless communications systems 100 and 200 as described with reference to FIGS. 1 and 2, respectively. For example, resource diagram 600 may be implemented by a UE 115 and a base station 105 to support the configuration and allocation of PUCCH resources that support the use of time domain waveforms for transmitting uplink control messages.

The resource diagram 600 depicts various examples of coherent PUCCH resources configured with various combinations of time-related parameters. For example, a configuration for a coherent PUCCH resource may include a set of coherent parameters associated with transmitting an uplink control message over the coherent PUCCH resource using a coherent time domain waveform. In some examples, the set of coherent parameters may include a starting symbol of the coherent PUCCH resource in a first slot or a first subframe; a first quantity of repetitions of the coherent PUCCH resource in the first slot or the first subframe; a second quantity of repetitions of the coherent PUCCH resource in a second slot or a second subframe; a quantity of symbols included in the coherent PUCCH resource; a quantity of PUCCH components included in the coherent PUCCH resource; a length of a (e.g., each) PUCCH component included in the coherent PUCCH resource; a starting location of the coherent PUCCH resource within the starting symbol; an indication of whether data, DMRSs, time gaps, or a combination thereof, are multiplexed on the coherent PUCCH resource; a density of DMRSs included in the uplink control message, a percentage of signals transmitted over the coherent PUCCH resource that are DMRSs (e.g., a DMRS overhead of the uplink control message); a beam hopping configuration; a time hopping configuration; a cover code; a starting symbol of a first DMRS block that is shared by a set of UEs 115; a starting location of the first DMRS block in the starting symbol of the first DMRS block; a length of the first DMRS block (e.g., in units of samples or symbols); a starting symbol of a second DMRS block that is specific to the UE 115; a starting location of the second DMRS block in the starting symbol of the second DMRS block; a length of the second DMRS block (e.g., in units of samples or symbols); or a combination thereof.

In some examples, the first DMRS block that is shared by the set of UEs 115 may refer to a DMRS block having a location in time and frequency that is shared among multiple UEs 115 (e.g., the set of UEs 115). Accordingly, each of the set of UEs 115 may transmit the DMRSs using the same time and frequency resources. The DMRSs may be individually decoded based on properties of each DMRS, such as an orthogonality of the DMRSs, among others. As a result of using the first DMRS block that is shared by the set of UEs, resource usage may be reduced. In some examples, the second DMRS block that is specific to the UE 115 may refer to a DMRS block that is specifically allocated to the UE 115. That is, the UE 115 may transmit DMRSs using time and frequency resources that are allocated to the UE 115 and not shared by other UEs 115. In some examples, a UE 115 may be configured with the first DMRS block or the second DMRS block. In some other examples, the UE 115 may be configured with both of the first DMRS block and the second DRMS block. For example, if the first DMRS block fails to satisfy DMRS signaling constraints associated with the UE 115, the UE 115 may be configured with the second DMRS block to satisfy such constraints. Here, the second DMRS block may be referred to as an additional DMRS block.

In a first example, a first coherent PUCCH resource may be configured with a first set of coherent parameters for transmitting a first uplink control message in a slot 605. The slot 605 may include a quantity of symbols 610. For example, the slot 605 may include 14 symbols 610 indexed 0 through 13. The first set of coherent parameters may include a first format index, a starting symbol 610 of the first coherent PUCCH resource in the slot 605, a starting location of the first coherent PUCCH resource in the starting symbol 610, a quantity of PUCCH components included in the first coherent PUCCH resource, a length of each PUCCH component, a DMRS density of the first uplink control message, and a DMRS overhead of the first uplink control message. For example, the first coherent PUCCH resource may be configured with the first set of coherent parameters as depicted in Table 4 below.

TABLE 4

| Format Index | 0 |
| --- | --- |
| Starting symbol in slot | 1 |
| Starting location in symbol | 0 |
| Quantity of PUCCH components | 1 |
| Length of PUCCH component | ½ symbol |
| DMRS Density | 2/20 |
| DMRS Overhead | 10% |

The first format index may indicate whether a PUCCH 615 transmitted over the first coherent PUCCH resource includes data, DMRSs, time gaps, or a combination thereof. For example, as shown in Table 4, the first format index may have a value of 0 (e.g., or some other value), which may indicate for the UE 115 to multiplex both data 620 and DMRSs on the PUCCH 615. The starting symbol 610 may correspond to the symbol 610-a, which may be the symbol 610 of the slot 605 with index 1, and the starting location in the starting symbol 610 may be 0, thereby indicating that the first coherent PUCCH resource (e.g., the PUCCH 615) starts at the beginning of the symbol 610-a. The quantity of PUCCH components included in the first coherent PUCCH resource may be one, and the length of the PUCCH component may be half a length of a symbol 610. The DMRS density may be 2/20 indicating that for every 20 samples of data 620, there is a DMRS block 625 of 2 samples. The DMRS overhead may be 10 percent indicating that 10 percent of samples included in a PUCCH component (e.g., and thus the PUCCH 615) are DMRSs.

Accordingly, to transmit the first uplink control message over the first coherent PUCCH resource in accordance with the first set of coherent parameters, the UE 115 may transmit the first uplink control message over the PUCCH 615 that includes a single PUCCH component and starts at the beginning of the symbol 610-a and ends at the halfway point of the symbol 610-a in time. The UE 115 may multiplex the data 620 and DMRS blocks 625 according to the indicated DMRS density and DMRS overhead.

In a second example, a second coherent PUCCH resource may be configured with a second set of coherent parameters for transmitting a second uplink control message in a slot 630. The slot 630 may include a quantity of symbols 635. For example, the slot 630 may include 14 symbols 635 indexed 0 through 13. The second set of coherent parameters may include a second format index, a starting symbol 635 of the second coherent PUCCH resource in the slot 630, a starting location of the second coherent PUCCH resource in the starting symbol 635 of the second coherent PUCCH resource, a quantity of PUCCH components included in the second coherent PUCCH resource, a length of each PUCCH component, a cover code to apply to second coherent PUCCH resource to support code division multiplexing, a starting symbol 635 of a shared DMRS block 645, a starting location of the shared DMRS block 645 within the starting symbol 635 of the shared DMRS block 645, a length of the shared DMRS block 645, a starting symbol of a UE-specific DMRS block 650, a starting location of the UE-specific DMRS block 650 within the starting symbol 635 of the UE-specific DMRS block 650, and a length of the UE-specific DMRS block 650. For example, the second coherent PUCCH resource may be configured with the second set of coherent parameters as depicted in Table 5 below.

TABLE 5

| Format Index | 1 |
| --- | --- |
| Starting symbol in slot | 1 |
| Starting location in symbol | ½ symbol |
| Quantity of PUCCH components | 2 |
| Length of PUCCH component | ½ symbol |
| Cover Code | [1, −1] |
| Shared DMRS location | 8 |
| Shared DMRS start location in symbol | 0 |
| Shared DMRS length | 1 symbol |
| Additional DMRS location | 9 |
| Additional DMRS start location in symbol | 0 |
| Additional DMRS length | ½ symbol |

As shown in Table 5, the second format index may have a value of 1 (e.g., or some other value), which may indicate for the UE 115 to include a single type of signal in a PUCCH component (e.g., include data 640 or a DMRS block). The starting symbol 635 of the second coherent PUCCH may correspond to the symbol 635-a, which may be the symbol 635 of the slot 630 with index 1, and the starting location in the starting symbol 635 of the second coherent PUCCH may be half of a length of a symbol 635, thereby indicating that the second coherent PUCCH resource starts at the midpoint (e.g., halfway point) of the symbol 635-a in time. The quantity of PUCCH components included in the second coherent PUCCH resource may be two, and the length of the PUCCH components may be half of a length of a symbol 635. The cover code for code division multiplexing may be [1, −1]. The starting symbol 635 of the shared DMRS block 645 may correspond to a symbol 635-c, which may be the symbol 635 of the slot 630 with index 8, and the starting location in the starting symbol 635 of the shared DMRS block 645 may be 0, thereby indicating that the shared DMRS block 645 starts at the beginning of the symbol 635-c in time. The length of the shared DMRS block 645 may be 1 symbol 635. The starting symbol 635 of the UE-specific DMRS block 650 may correspond to a symbol 635-d, which may be the symbol 635 of the slot 630 with index 9, and the starting location in the starting symbol 635 of the UE-specific DMRS block 650 may be 0, thereby indicating that the UE-specific DMRS block 650 starts at the beginning of the symbol 635-d in time. The length of the UE-specific DMRS block 650 may be half of a symbol 635.

Accordingly, to transmit the second uplink control message over the second coherent PUCCH resource in accordance with the second set of coherent parameters, the UE 115 may transmit data 640-*a* and data 640-*b* included in the second uplink control message over a first PUCCH component starting at the halfway point of the symbol 635-*a* and a second PUCCH component starting at the beginning of a symbol 635-*b* corresponding to the symbol 635 having an index of 2. The UE 115 may also transmit the shared DMRS block 645 in a third PUCCH component over the symbol 635-*c* and the UE-specific DMRS block in a fourth PUCCH component over the symbol 635-*d*. Additionally, the UE 115 may apply the [1, −1] cover code to the second uplink control message.

In a third example, a third coherent PUCCH resource may be configured with a third set of coherent parameters for transmitting a third uplink control message in a slot 655. The slot 655 may include a quantity of symbols 660. For example, the slot 655 may include 14 symbols 660 indexed 0 through 13. The third set of coherent parameters may include a third format index, a starting symbol 660 of the third coherent PUCCH resource in the slot 655, a starting location of the third coherent PUCCH resource in the starting symbol 660, a quantity of symbols included in a PUCCH 665 transmitted over the third coherent PUCCH resource, a quantity of PUCCH components included in the PUCCH 665, a length of each PUCCH component, a location of a DMRS block 675 included in the PUCCH 665, a length of the DMRS block 675, a beam hopping configuration associated with transmitting the third uplink control message, and a time hopping configuration associated with transmitting the third uplink control message. For example, the third coherent PUCCH resource may be configured with the third set of coherent parameters as depicted in Table 6 below.

TABLE 6

| | |
|---|---|
| Format Index | 1 |
| Starting symbol in slot | 1 |
| Starting location in symbol | 0 |
| Quantity of symbols | 2 |
| Quantity of PUCCH components | 1 |
| Length of PUCCH component | ½ symbol |
| DMRS location | 2 |
| DMRS length | 1 symbol |
| Beam for Hop 1 | Beam 690 |
| Beam Gap | ½ symbol |
| Beam for Hop 2 | Beam 695 |
| Reuse PUCCH Parameters for Hop 2 | Yes |
| Time Hop | None |

As shown in Table 6, the third format index may have a value of 1 (e.g., or some other value), which may indicate for the UE 115 to include a single type of signal in a PUCCH component (e.g., include data 670 or a DMRS block 675). The starting symbol 660 may correspond to the symbol 660-*a*, which may be the symbol 660 of the slot 655 with index 1, and the starting location in the starting symbol 660 may be 0, thereby indicating that the third coherent PUCCH resource starts at the beginning of the symbol 660-*a*. The quantity of symbols included in a PUCCH 665 may be 2, the quantity of PUCCH components 680 included in the PUCCH 665 may be 1, and the length of the PUCCH component 680 may be half of a length of a symbol 660. Here, the length of the PUCCH component 680 may indicate the additional length of the PUCCH 665 beyond the quantity of symbols included in the PUCCH 665. Accordingly, a length of the PUCCH 665 may be two and a half symbols 660. The location of the DMRS block 675 may be a second symbol of the PUCCH 665, and a length of the DMRS block may be 1 symbol 660. The beam hopping configuration may indicate that that the UE 115 is to use a beam 690 to transmit a first PUCCH 665-*a* over the third coherent PUCCH resource and a beam 695 to transmit a second PUCCH 665-*b* over the third coherent PUCCH resource. The beam hopping configuration may further indicate a duration of a beam gap 685 between the first PUCCH 665-*a* and the second PUCCH 665-*a* to be half of a symbol 660 in order to enable the UE 115 to switch from the beam 690 to the beam 695. The beam hopping configuration may further indicate that the UE 115 is to reuse the indicated coherent parameters after the beam hop to transmit the second PUCCH 665-*b*. The time hopping configuration may indicate that time hopping is not configured within a PUCCH 550. In some examples, if time hopping is configured, the time hopping configuration may indicate a time hop within a PUCCH 665, such as a time hop from within a symbol 660 or a time hope from a first symbol 660 to a second symbol 660.

Accordingly, to transmit the third uplink control message over the third coherent PUCCH resource in accordance with the third set of coherent parameters, the UE 115 may transmit the third uplink control message over the PUCCH 665-*a* using the beam 690 and the PUCCH 665-*b* using the beam 695, where the PUCCH 665-*a* may start at the beginning of the symbol 660-*a* and span a symbol 660-*b* corresponding to a symbol 660 having an index 2 and half of a symbol 660-*c* corresponding to a symbol 660 having an index 3 and the PUCCH 665-*b* may start at the beginning of a symbol 660-*d* corresponding to a symbol 660 having an index 4 and span a symbol 660-*e* corresponding to a symbol 660 having an index 5 and half of a symbol 660-*f* corresponding to a symbol 660 having an index 6 based on beginning after beam gap 685 and reusing the coherent parameters. The UE 115 may include data 670-*a* in the first symbol of the PUCCH 665-*a* (e.g., the symbol 660-*a*) and a DMRS block 675-*a* in the second symbol of the PUCCH 665-*a* (e.g., the symbol 660-*b*). The UE 115 may additionally transmit data over a PUCCH component 680-*a* included in the PUCCH 665-*a* after the two symbols 660 configured for the PUCCH 665-*a*. The UE 115 may include data 670-*b* in the first symbol of the PUCCH 665-*b* (e.g., the symbol 660-*d*) and a DMRS block 675-*n* in the second symbol of the PUCCH 665-*b* (e.g., the symbol 660-*e*). The UE 115 may additionally transmit data over a PUCCH component 680-*b* included in the PUCCH 665-*b* after the two symbol 660 configured for the PUCCH 665-*b*.

It is noted that, for illustrative purposes, the first, second, and third coherent PUCCH resources are depicted with the respective sets of coherent parameters. However, the techniques described herein may be adapted an applied to cover configuring a coherent PUCCH resource with any combination of coherent parameters.

Figure 7:
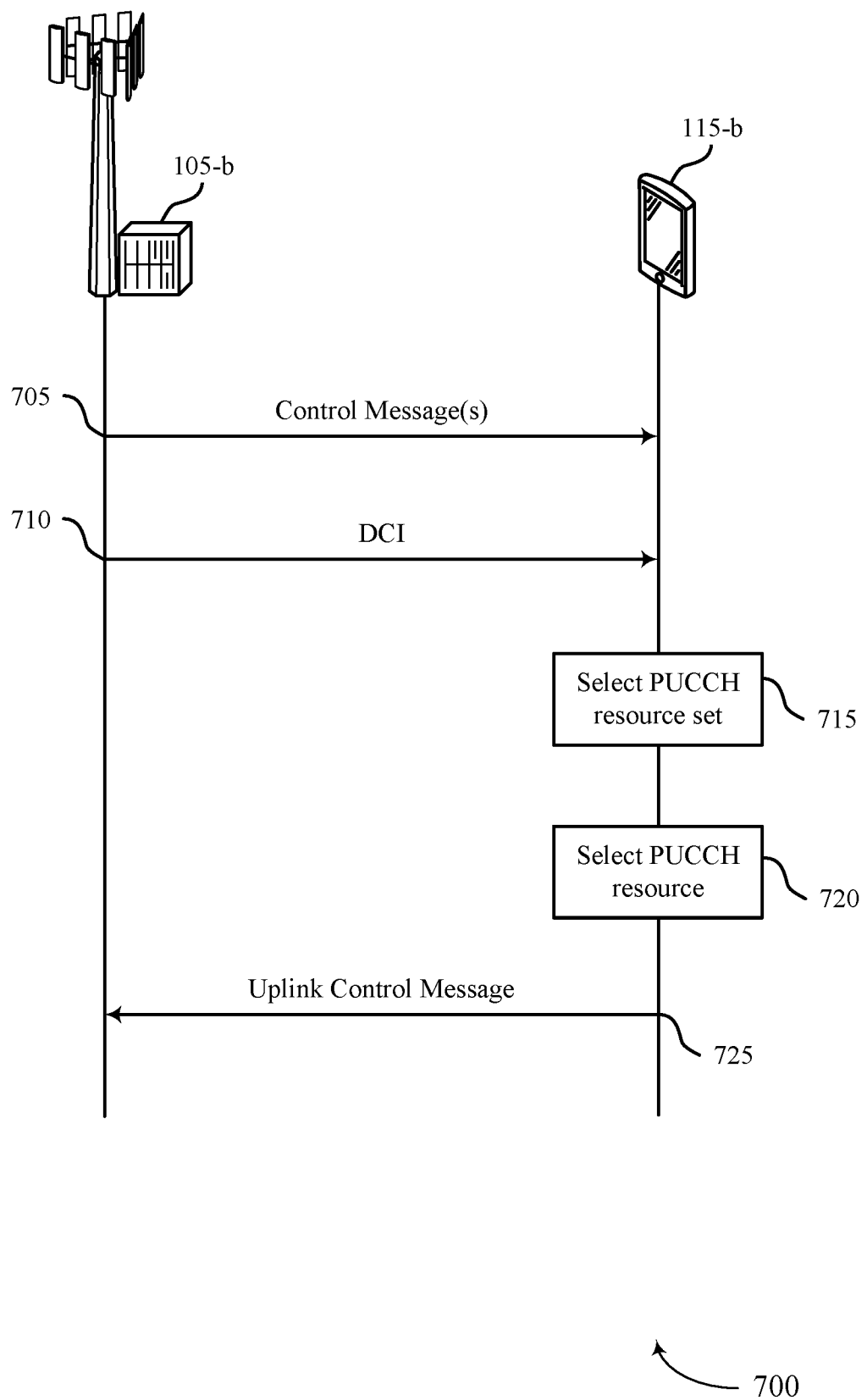
FIG. 7 illustrates an example of a process flow that supports PUCCH resource allocation techniques in accordance with aspects of the present disclosure.

FIG. 7 illustrates an example of a process flow 700 that supports PUCCH resource allocation techniques in accordance with aspects of the present disclosure. The process flow 700 may implement or may be implemented by aspects of the wireless communications systems 100 and 200 as described with reference to FIGS. 1 and 2, respectively. For example, the process flow 700 may be implemented by a base station 105-*b* and a UE 115-*b* to support the configuration and allocation of time domain waveform supporting PUCCH resources to reduce processing time, increase phase noise resiliency, increase reliability, reduce PAPR, reduce power consumption, increase data rates, and increase spectral efficiency, among other benefits.

The base station 105-*b* and the UE 115-*b* may each be respective examples of a base station 105 and a UE 115 described herein, including with reference to FIGS. 1 through 6. In the following description of the process flow 700, the operations may be performed in different orders or at different times. Some operations also may be omitted from the process flow 700, and other operations may be added to the process flow 700. Further, although some operations or signaling may be shown to occur at different times for discussion purposes, these operations may actually occur at the same time.

At 705, the base station 105-*b* may transmit one or more control messages to the UE 115-*b* that indicate (e.g., configure) a first group of non-coherent PUCCH resource sets and a second group of coherent PUCCH resource sets. The first group of non-coherent PUCCH resource sets may include non-coherent PUCCH resource sets that each include one or more non-coherent PUCCH resources configured with respective sets of non-coherent PUCCH parameters. The second group of coherent PUCCH resource sets may include coherent PUCCH resource sets that each include one or more coherent PUCCH resources configured with respective sets of coherent PUCCH parameters.

At 710, the base station 105-*b* may transmit DCI to the UE 115-*b* that indicates a type of time domain waveform for the UE 115-*b* to use to transmit an uplink control message. For example, the DCI may indicate for the UE 115-*b* to use a non-coherent time domain waveform or a coherent time domain waveform to transmit the uplink control message. The DCI may further indicate a PUCCH resource (e.g., an index of the PUCCH resource) within a UE-selected PUCCH resource set that the UE 115-*b* is to use to transmit the uplink control message.

At 715, the UE 115-*b* may select the PUCCH resource set from the first group or the second group based on the DCI and based on a quantity of control bits included in the uplink control message (e.g., indicated by the DCI). For example, if the DCI indicates for the UE 115-*b* to use a non-coherent time domain waveform, the UE 115-*b* may select the PUCCH resource set from the first group of non-coherent PUCCH resource sets that is associated with transmitting the quantity of control bits. Alternatively, if the DCI indicates for the UE 115-*b* to use a coherent time domain waveform, the UE 115-*b* may select the PUCCH resource set from the second group of coherent PUCCH resource sets that is associated with transmitting the quantity of control bits.

At 720, the UE 115-*b* may select the PUCCH resource from the selected PUCCH resource set. For example, the UE 115-*b* may select the PUCCH resource corresponding to the index indicated by the DCI. Additionally, or alternatively, the UE 115-*b* may map a starting location of a PDCCH, which includes the DCI, in a symbol or a slot to the PUCCH resource.

At 725, the UE 115-*b* may transmit the uplink control message to the base station 105-*b* in accordance with the type of time domain waveform associated with the selected PUCCH resource (e.g., indicated by the DCI) and over the selected PUCCH resource. The UE 115-*b* may transmit the uplink control message in accordance with the set of non-coherent parameters or coherent parameters corresponding to the selected PUCCH resource.

Figure 8:
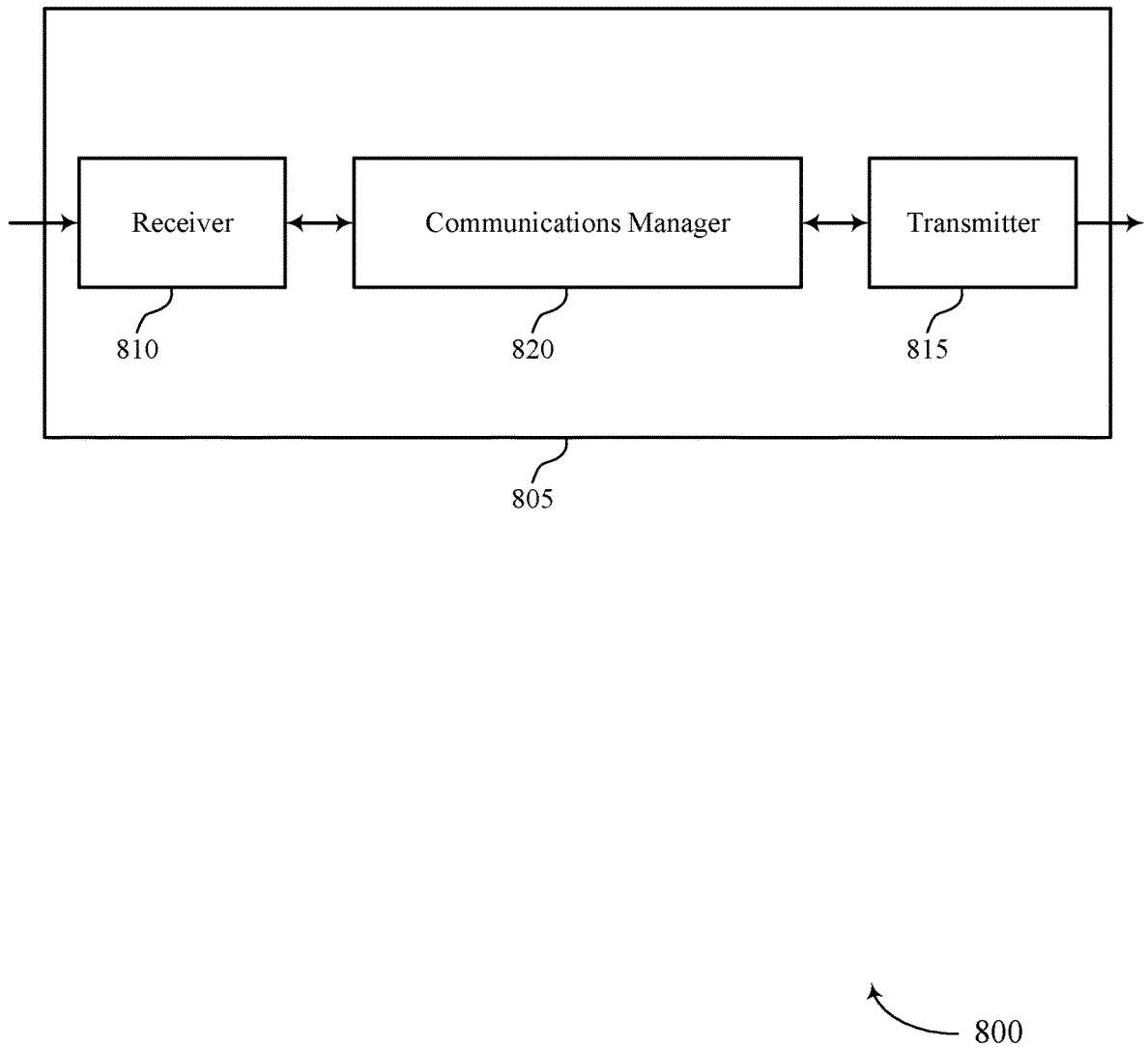
FIGS. 8 and 9 show block diagrams of devices that support PUCCH resource allocation techniques in accordance with aspects of the present disclosure.

FIG. 8 shows a block diagram 800 of a device 805 that supports PUCCH resource allocation techniques in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to PUCCH resource allocation techniques). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to PUCCH resource allocation techniques). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of PUCCH resource allocation techniques as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. For example, the communications manager 820 may be configured as or otherwise support a means for receiving, from a base station, signaling indicating a first group of PUCCH resource sets associated with a first type of time domain waveform for transmitting uplink control messages and a second group of PUCCH resource sets associated with a second type of time domain waveform for transmitting uplink control messages. The communications manager 820 may be configured as or otherwise support a means for receiving, from the base station, DCI indicating a type of time domain waveform for transmitting an uplink control message and a first resource of a PUCCH resource set for transmitting the uplink control message, the PUCCH resource set from the first group or the second group based on the type of time domain waveform. The communications manager 820 may be configured as or otherwise support a means for transmitting, to the base station and in accordance with the type of time domain waveform, the uplink control message over the first resource of the PUCCH resource set.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reduced processing, reduced power consumption, and more efficient utilization of communication resources by supporting PUCCH transmissions using time domain waveforms. For example, using a time domain waveform to transmit a PUCCH message may be associated with reduced processing time, increased resiliency to phase noise at high frequencies, and reduced PAPR compared to transmitting a PUCCH message using a frequency domain waveform.

Figure 9:
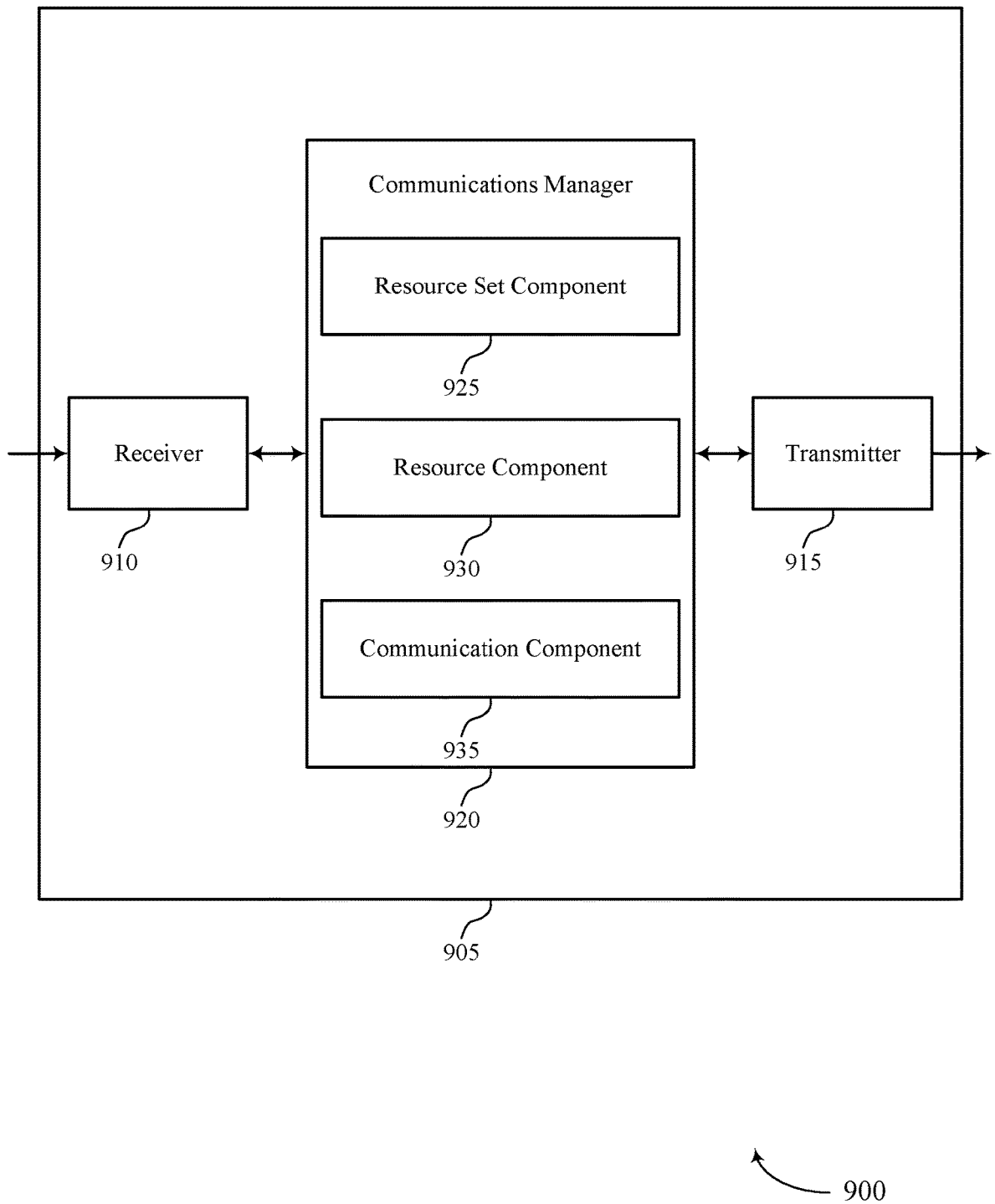

FIG. 9 shows a block diagram 900 of a device 905 that supports PUCCH resource allocation techniques in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to PUCCH resource allocation techniques). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to PUCCH resource allocation techniques). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of PUCCH resource allocation techniques as described herein. For example, the communications manager 920 may include a resource set component 925, a resource component 930, a communication component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. The resource set component 925 may be configured as or otherwise support a means for receiving, from a base station, signaling indicating a first group of PUCCH resource sets associated with a first type of time domain waveform for transmitting uplink control messages and a second group of PUCCH resource sets associated with a second type of time domain waveform for transmitting uplink control messages. The resource component 930 may be configured as or otherwise support a means for receiving, from the base station, DCI indicating a type of time domain waveform for transmitting an uplink control message and a first resource of a PUCCH resource set for transmitting the uplink control message, the PUCCH resource set from the first group or the second group based on the type of time domain waveform. The communication component 935 may be configured as or otherwise support a means for transmitting, to the base station and in accordance with the type of time domain waveform, the uplink control message over the first resource of the PUCCH resource set.

Figure 10:
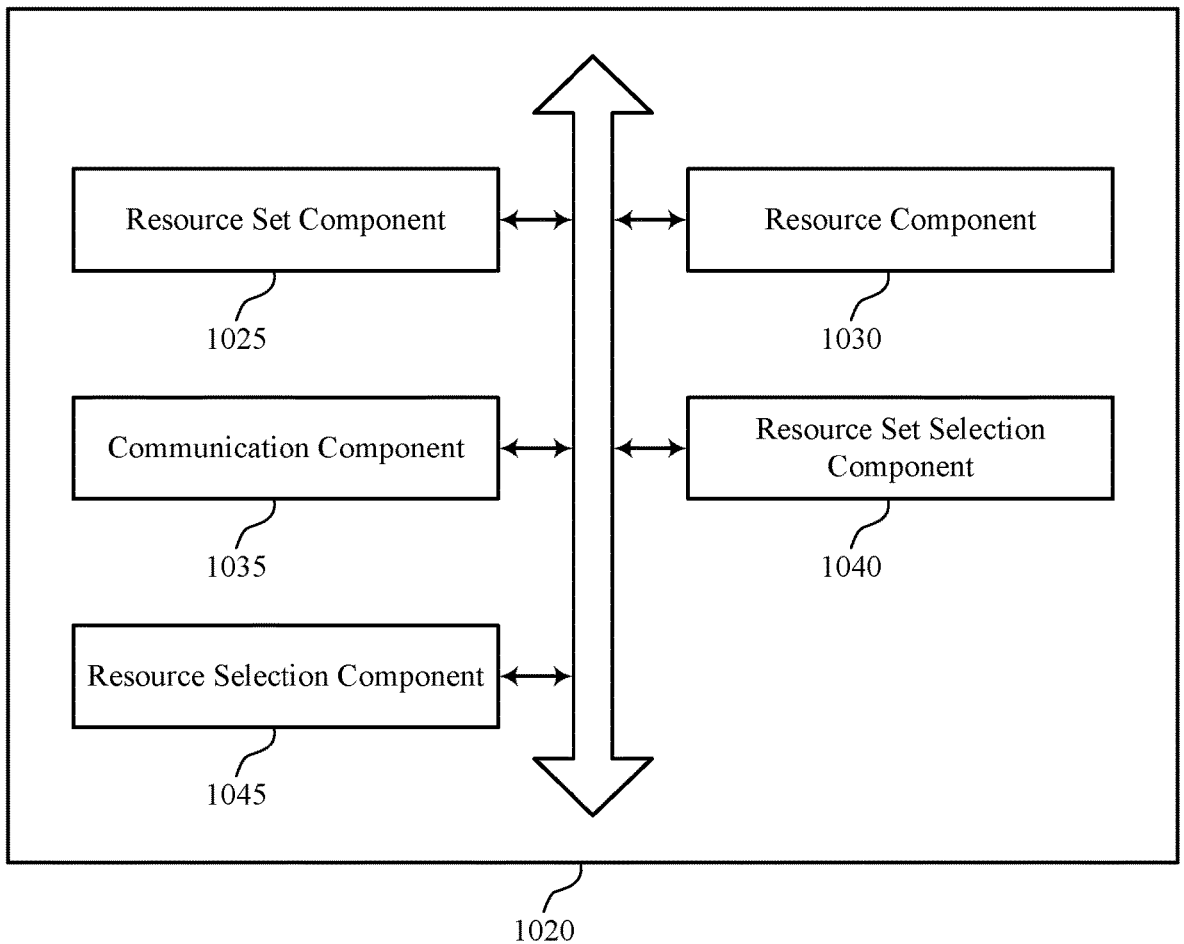
FIG. 10 shows a block diagram of a communications manager that supports PUCCH resource allocation techniques in accordance with aspects of the present disclosure.

FIG. 10 shows a block diagram 1000 of a communications manager 1020 that supports PUCCH resource allocation techniques in accordance with aspects of the present disclosure. The communications manager 1020 may be an example of aspects of a communications manager 820, a communications manager 920, or both, as described herein. The communications manager 1020, or various components thereof, may be an example of means for performing various aspects of PUCCH resource allocation techniques as described herein. For example, the communications manager 1020 may include a resource set component 1025, a resource component 1030, a communication component 1035, a resource set selection component 1040, a resource selection component 1045, or any combination thereof. Each of these components may communicate, directly or indirectly, with one another (e.g., via one or more buses).

The communications manager 1020 may support wireless communication at a UE in accordance with examples as disclosed herein. The resource set component 1025 may be configured as or otherwise support a means for receiving, from a base station, signaling indicating a first group of PUCCH resource sets associated with a first type of time domain waveform for transmitting uplink control messages and a second group of PUCCH resource sets associated with a second type of time domain waveform for transmitting uplink control messages. The resource component 1030 may be configured as or otherwise support a means for receiving, from the base station, DCI indicating a type of time domain waveform for transmitting an uplink control message and a first resource of a PUCCH resource set for transmitting the uplink control message, the PUCCH resource set from the first group or the second group based on the type of time domain waveform. The communication component 1035 may be configured as or otherwise support a means for transmitting, to the base station and in accordance with the type of time domain waveform, the uplink control message over the first resource of the PUCCH resource set.

In some examples, the resource set selection component 1040 may be configured as or otherwise support a means for selecting the PUCCH resource set from the first group based on a quantity of control bits included in the uplink control message and the type of time domain waveform corresponding to the first type of time domain waveform. In some examples, the resource selection component 1045 may be configured as or otherwise support a means for selecting the first resource within the PUCCH resource set based on the DCI.

In some examples, the resource set selection component 1040 may be configured as or otherwise support a means for selecting the PUCCH resource set from the second group based on a quantity of control bits included in the uplink control message and the type of time domain waveform corresponding to the second type of time domain waveform. In some examples, the resource selection component 1045 may be configured as or otherwise support a means for selecting the first resource within the PUCCH resource set based on the DCI.

In some examples, the signaling further indicates a respective quantity of resources included in each PUCCH resource set of the first group, each resource corresponding to a respective set of parameters associated with transmitting uplink control messages over the resource. In some examples, the uplink control message is transmitted in accordance with a first set of parameters corresponding to the first resource.

In some examples, the first set of parameters includes a starting symbol of the first resource in a first slot or a first subframe, a first quantity of repetitions of the first resource in the first slot or the first subframe, a second quantity of repetitions of the first resource in a second slot or a second subframe, a starting location of the first resource within the starting symbol, a type of sequence for transmitting the uplink control message, an indication of whether to use one or more cyclic shifts, one or more roots of a sequence, or both, to indicate information included in the uplink control message, a beam hopping configuration, a time hopping configuration, a cover code, or a combination thereof.

In some examples, the first set of parameters includes a quantity of symbols included in the first resource, a quantity of PUCCH components included in the first resource, a length of each PUCCH component, or a combination thereof. In some examples, the length is based on a length of a sequence used to transmit uplink control messages over the first resource.

In some examples, the signaling further indicates a respective quantity of resources included in each PUCCH resource set of the second group, each resource corresponding to a respective set of parameters associated with transmitting uplink control messages over the resource. In some examples, the uplink control message is transmitted in accordance with a first set of parameters corresponding to the first resource.

In some examples, the first set of parameters includes a starting symbol of the first resource in a first slot or a first subframe, a first quantity of repetitions of the first resource in the first slot or the first subframe, a second quantity of repetitions of the first resource in a second slot or a second subframe, a starting location of a PUCCH within the starting symbol, an indication of whether data, DMRSs, time gaps, or a combination thereof, are multiplexed on the first resource, a density of DMRSs included in the uplink control message, a percentage of signals transmitted over the first resource that are DMRSs, a beam hopping configuration, a time hopping configuration, a cover code, or a combination thereof.

In some examples, the first set of parameters includes a quantity of symbols included in the first resource, a quantity of PUCCH components included in the first resource, a length of each PUCCH component, or a combination thereof.

In some examples, the length of each PUCCH component corresponds to a minimum time interval that includes a DMRS block, a minimum time interval that includes at least a threshold quantity of DMRS samples, or a fixed time interval that is based on a bandwidth associated with the first resource.

In some examples, the first set of parameters includes a starting symbol of a first DMRS block that is shared by a set of UEs including the UE, a starting location of the first DMRS block in the starting symbol of the first DMRS block, a length of the first DMRS block, a starting symbol of a second DMRS block that is specific to the UE, a starting location of the second DMRS block in the starting symbol of the second DMRS block, a length of the second DMRS block, or a combination thereof.

In some examples, each PUCCH resource set of the first group and the second group is associated with transmitting a respective quantity of control bits. In some examples, the PUCCH resource set is based on a quantity of control bits included in the uplink control message.

In some examples, the first type of time domain waveform corresponds to a sequence-based time domain waveform that excludes DMRSs. In some examples, the second type of time domain waveform corresponds to a time domain waveform that includes one or more DMRSs.

In some examples, the first resource of the PUCCH resource set is further indicated based on a starting location of a PDCCH within a symbol or a slot, the DCI transmitted over the PDCCH.

Figure 11:
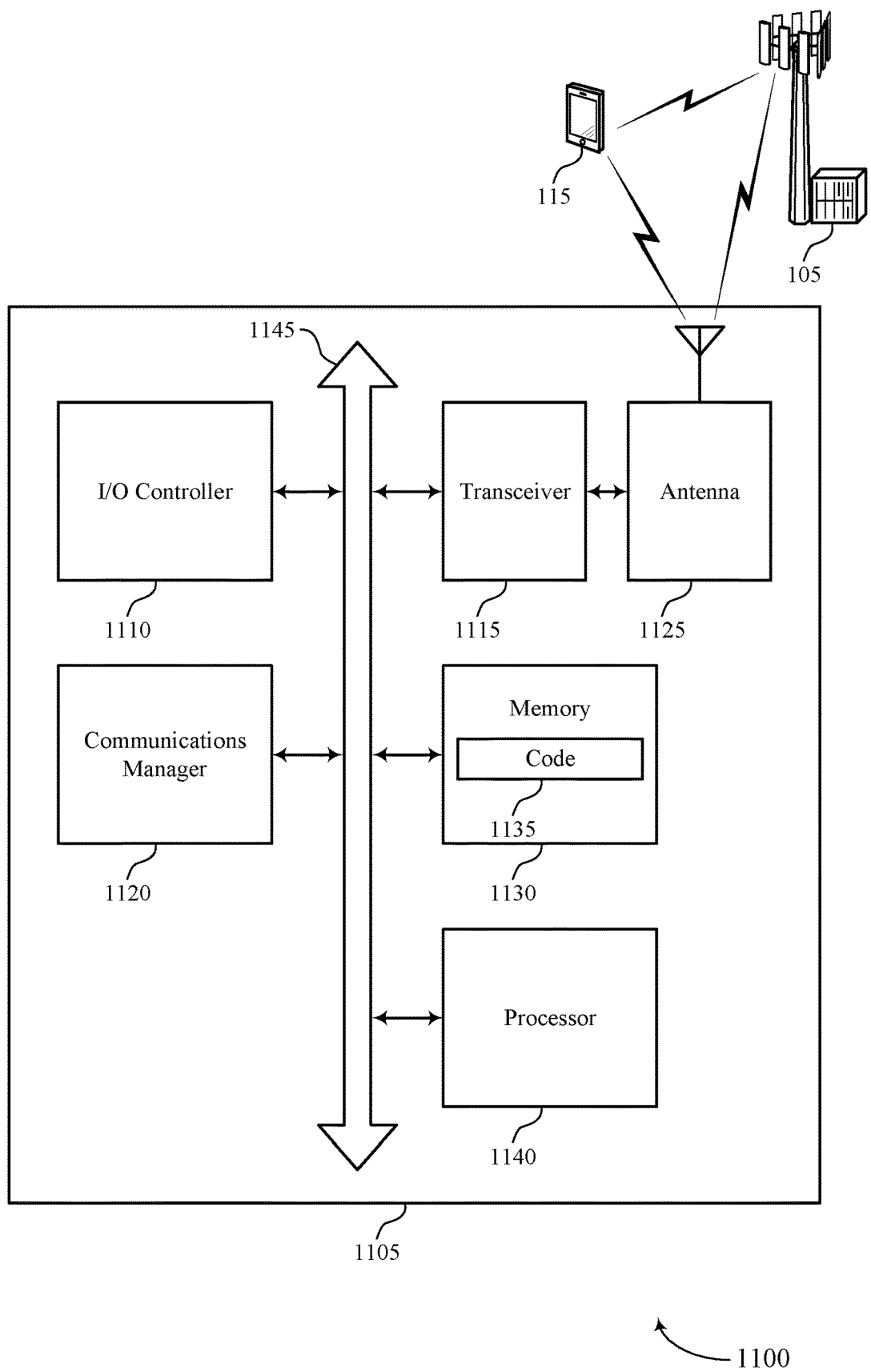
FIG. 11 shows a diagram of a system including a device that supports PUCCH resource allocation techniques in accordance with aspects of the present disclosure.

FIG. 11 shows a diagram of a system 1100 including a device 1105 that supports PUCCH resource allocation techniques in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting PUCCH resource allocation techniques). For example, the device 1105 or a component of the device 1105 may include a processor 1140 and memory 1130 coupled to the processor 1140, the processor 1140 and memory 1130 configured to perform various functions described herein.

The communications manager 1120 may support wireless communication at a UE in accordance with examples as disclosed herein. For example, the communications manager 1120 may be configured as or otherwise support a means for receiving, from a base station, signaling indicating a first group of PUCCH resource sets associated with a first type of time domain waveform for transmitting uplink control messages and a second group of PUCCH resource sets associated with a second type of time domain waveform for transmitting uplink control messages. The communications manager 1120 may be configured as or otherwise support a means for receiving, from the base station, DCI indicating a type of time domain waveform for transmitting an uplink control message and a first resource of a PUCCH resource set for transmitting the uplink control message, the PUCCH resource set from the first group or the second group based on the type of time domain waveform. The communications manager 1120 may be configured as or otherwise support a means for transmitting, to the base station and in accordance with the type of time domain waveform, the uplink control message over the first resource of the PUCCH resource set.

By including or configuring the communications manager 1120 in accordance with examples as described herein, the device 1105 may support techniques for increased reliability, increased data rates, reduced latency, reduced processing, increased spectral efficiency, reduced power consumption, increased resource utilization, improved coordination between devices, longer battery life, and improved utilization of processing capability, among other benefits.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of PUCCH resource allocation techniques as described herein, or the processor 1140 and the memory 1130 may be otherwise configured to perform or support such operations.

Figure 12:
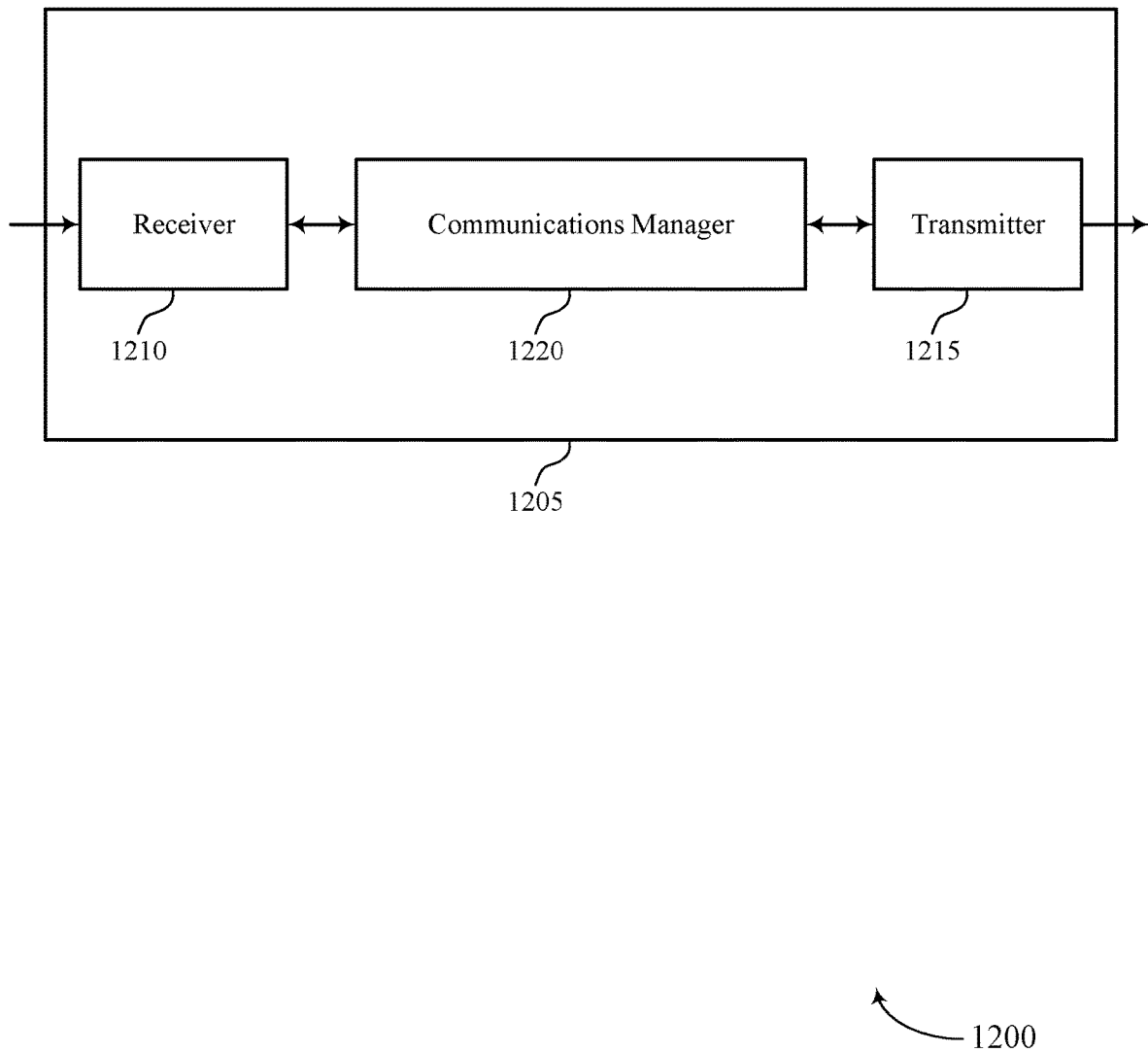
FIGS. 12 and 13 show block diagrams of devices that support PUCCH resource allocation techniques in accordance with aspects of the present disclosure.

FIG. 12 shows a block diagram 1200 of a device 1205 that supports PUCCH resource allocation techniques in accordance with aspects of the present disclosure. The device 1205 may be an example of aspects of a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to PUCCH resource allocation techniques). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to PUCCH resource allocation techniques). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of PUCCH resource allocation techniques as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions of the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. For example, the communications manager 1220 may be configured as or otherwise support a means for transmitting, to a UE, signaling indicating a first group of PUCCH resource sets associated with a first type of time domain waveform for transmitting uplink control messages and a second group of PUCCH resource sets associated with a second type of time domain waveform for transmitting uplink control messages. The communications manager 1220 may be configured as or otherwise support a means for transmitting, to the UE, DCI indicating a type of time domain waveform for transmitting an uplink control message and a first resource of a selected PUCCH resource set for transmitting the uplink control message, the selected PUCCH resource set from the first group or the second group based on the type of time domain waveform. The communications manager 1220 may be configured as or otherwise support a means for receiving, from the UE and in accordance with the type of time domain waveform, the uplink control message over the first resource of the selected PUCCH resource set.

By including or configuring the communications manager 1220 in accordance with examples as described herein, the device 1205 (e.g., a processor controlling or otherwise coupled to the receiver 1210, the transmitter 1215, the communications manager 1220, or a combination thereof) may support techniques for reduced processing, reduced power consumption, and more efficient utilization of communication resources by supporting the communication of PUCCH transmissions using time domain waveforms.

Figure 13:
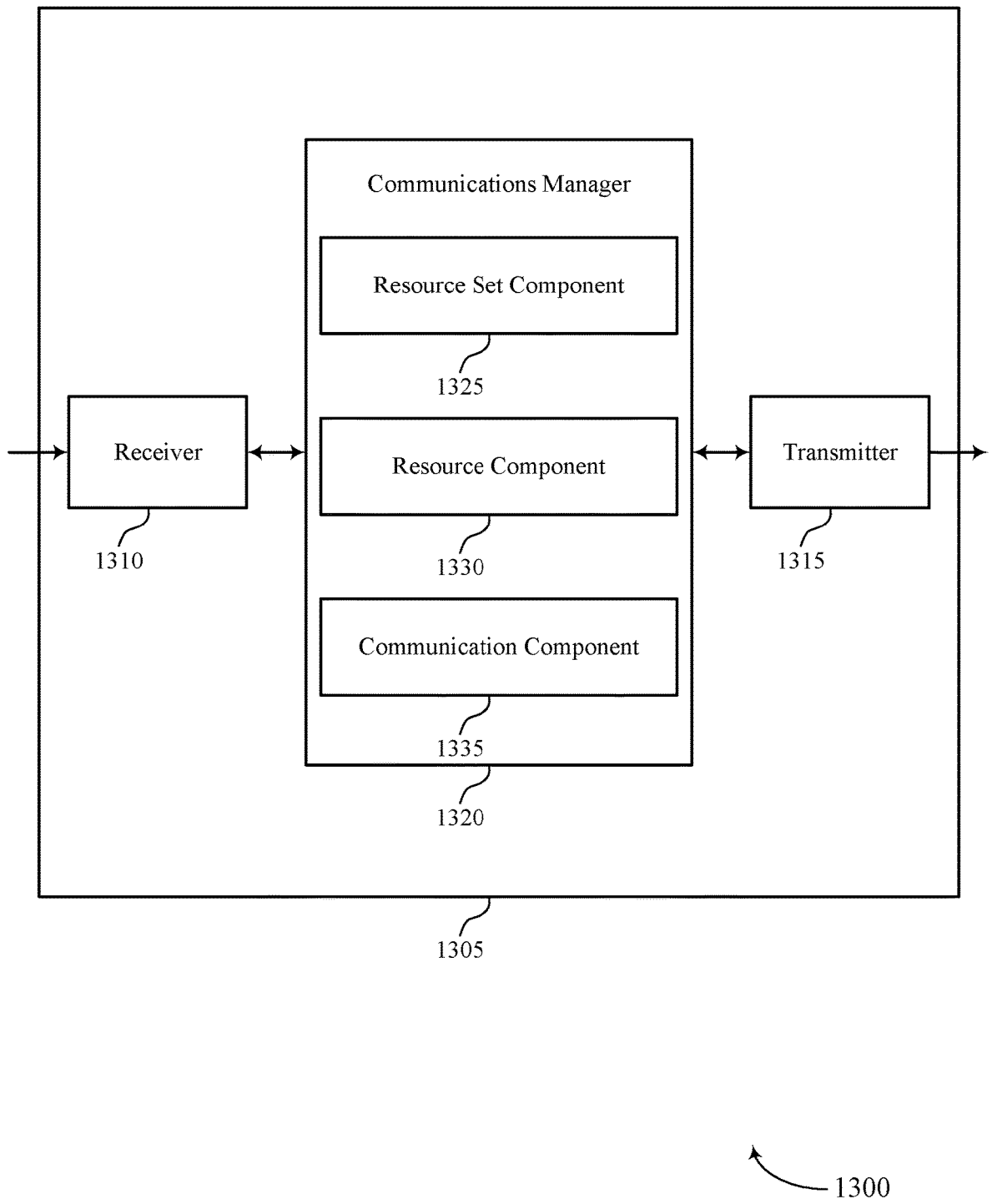

FIG. 13 shows a block diagram 1300 of a device 1305 that supports PUCCH resource allocation techniques in accordance with aspects of the present disclosure. The device 1305 may be an example of aspects of a device 1205 or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to PUCCH resource allocation techniques). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to PUCCH resource allocation techniques). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of PUCCH resource allocation techniques as described herein. For example, the communications manager 1320 may include a resource set component 1325, a resource component 1330, a communication component 1335, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a base station in accordance with examples as disclosed herein. The resource set component 1325 may be configured as or otherwise support a means for transmitting, to a UE, signaling indicating a first group of PUCCH resource sets associated with a first type of time domain waveform for transmitting uplink control messages and a second group of PUCCH resource sets associated with a second type of time domain waveform for transmitting uplink control messages. The resource component 1330 may be configured as or otherwise support a means for transmitting, to the UE, DCI indicating a type of time domain waveform for transmitting an uplink control message and a first resource of a selected PUCCH resource set for transmitting the uplink control message, the selected PUCCH resource set from the first group or the second group based on the type of time domain waveform. The communication component 1335 may be configured as or otherwise support a means for receiving, from the UE and in accordance with the type of time domain waveform, the uplink control message over the first resource of the selected PUCCH resource set.

Figure 14:
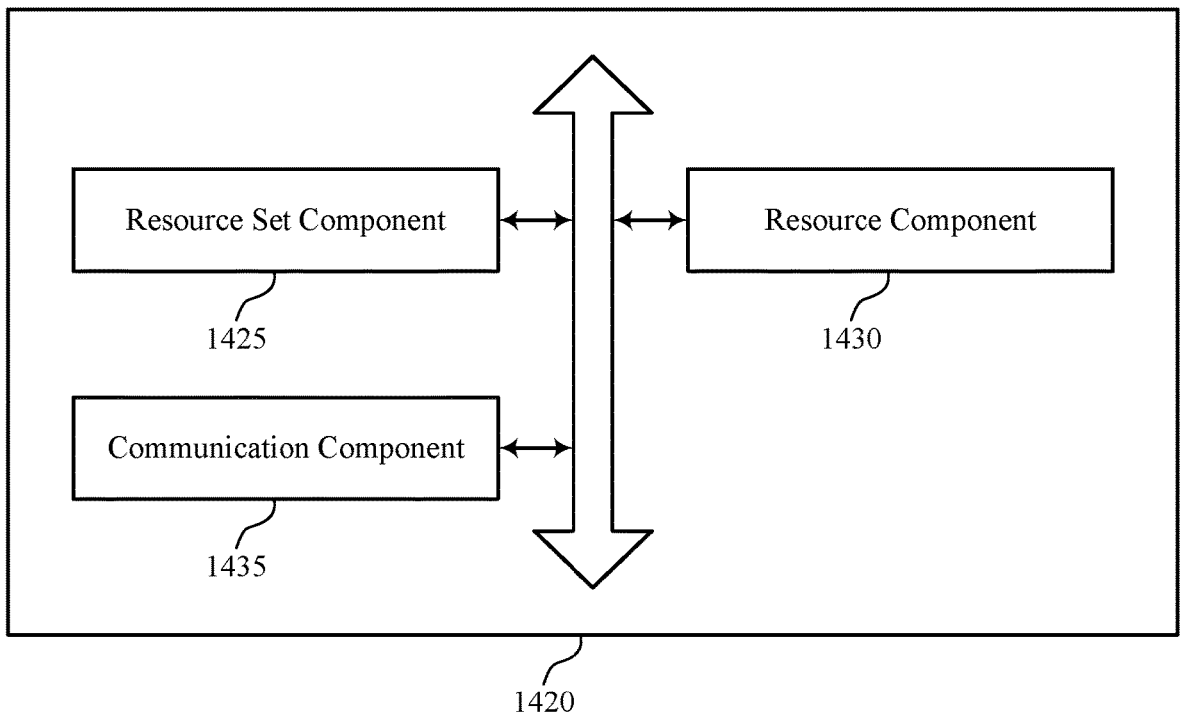
FIG. 14 shows a block diagram of a communications manager that supports PUCCH resource allocation techniques in accordance with aspects of the present disclosure.

FIG. 14 shows a block diagram 1400 of a communications manager 1420 that supports PUCCH resource allocation techniques in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of PUCCH resource allocation techniques as described herein. For example, the communications manager 1420 may include a resource set component 1425, a resource component 1430, a communication component 1435, or any combination thereof. Each of these components may communicate, directly or indirectly, with one another (e.g., via one or more buses).

The communications manager 1420 may support wireless communication at a base station in accordance with examples as disclosed herein. The resource set component 1425 may be configured as or otherwise support a means for transmitting, to a UE, signaling indicating a first group of PUCCH resource sets associated with a first type of time domain waveform for transmitting uplink control messages and a second group of PUCCH resource sets associated with a second type of time domain waveform for transmitting uplink control messages. The resource component 1430 may be configured as or otherwise support a means for transmitting, to the UE, DCI indicating a type of time domain waveform for transmitting an uplink control message and a first resource of a selected PUCCH resource set for transmitting the uplink control message, the selected PUCCH resource set from the first group or the second group based on the type of time domain waveform. The communication component 1435 may be configured as or otherwise support a means for receiving, from the UE and in accordance with the type of time domain waveform, the uplink control message over the first resource of the selected PUCCH resource set.

In some examples, the signaling further indicates a respective quantity of resources included in each PUCCH resource set of the first group, each resource corresponding to a respective set of parameters associated with transmitting uplink control messages over the resource. In some examples, the uplink control message is received in accordance with a first set of parameters corresponding to the first resource.

In some examples, the first set of parameters includes a starting symbol of the first resource in a first slot or a first subframe, a first quantity of repetitions of the first resource in the first slot or the first subframe, a second quantity of repetitions of the first resource in a second slot or a second subframe, a starting location of the first resource within the starting symbol, a type of sequence for transmitting the uplink control message, an indication of whether to use one or more cyclic shifts, one or more roots of a sequence, or both, to indicate information included in the uplink control message, a beam hopping configuration, a time hopping configuration, a cover code, or a combination thereof.

In some examples, the first set of parameters includes a quantity of symbols included in the first resource, a quantity of PUCCH components included in the first resource, a length of each PUCCH component, or a combination thereof. In some examples, the length is based on a length of a sequence used to transmit uplink control messages over the first resource.

In some examples, the signaling further indicates a respective quantity of resources included in each PUCCH resource set of the second group, each resource corresponding to a respective set of parameters associated with transmitting uplink control messages over the resource. In some examples, the uplink control message is received in accordance with a first set of parameters corresponding to the first resource.

In some examples, the first set of parameters includes a starting symbol of the first resource in a first slot or a first subframe, a first quantity of repetitions of the first resource in the first slot or the first subframe, a second quantity of repetitions of the first resource in a second slot or a second subframe, a starting location of a PUCCH within the starting symbol, an indication of whether data, DMRSs, time gaps, or a combination thereof, are multiplexed on the first resource, a density of DMRSs included in the uplink control message, a percentage of signals transmitted over the first resource that are DMRSs, a beam hopping configuration, a time hopping configuration, a cover code, or a combination thereof.

In some examples, the first set of parameters includes a quantity of symbols included in the first resource, a quantity of PUCCH components included in the first resource, a length of each PUCCH component, or a combination thereof.

In some examples, the length of each PUCCH component corresponds to a minimum time interval that includes a DMRS block, a minimum time interval that includes at least a threshold quantity of DMRS samples, or a fixed time interval that is based on a bandwidth associated with the first resource.

In some examples, the first set of parameters includes a starting symbol of a first DMRS block that is shared by a set of UEs including the UE, a starting location of the first DMRS block in the starting symbol of the first DMRS block, a length of the first DMRS block, a starting symbol of a second DMRS block that is specific to the UE, a starting location of the second DMRS block in the starting symbol of the second DMRS block, a length of the second DMRS block, or a combination thereof.

In some examples, each PUCCH resource set of the first group and the second group is associated with transmitting a respective quantity of control bits. In some examples, the selected PUCCH resource set is based on a quantity of control bits included in the uplink control message.

In some examples, the first type of time domain waveform corresponds to a sequence-based time domain waveform that excludes DMRSs. In some examples, the second type of time domain waveform corresponds to a time domain waveform that includes one or more DMRSs.

In some examples, the first resource of the selected PUCCH resource set is further indicated based on a starting location of a PDCCH within a symbol or a slot, the DCI transmitted over the PDCCH.

Figure 15:
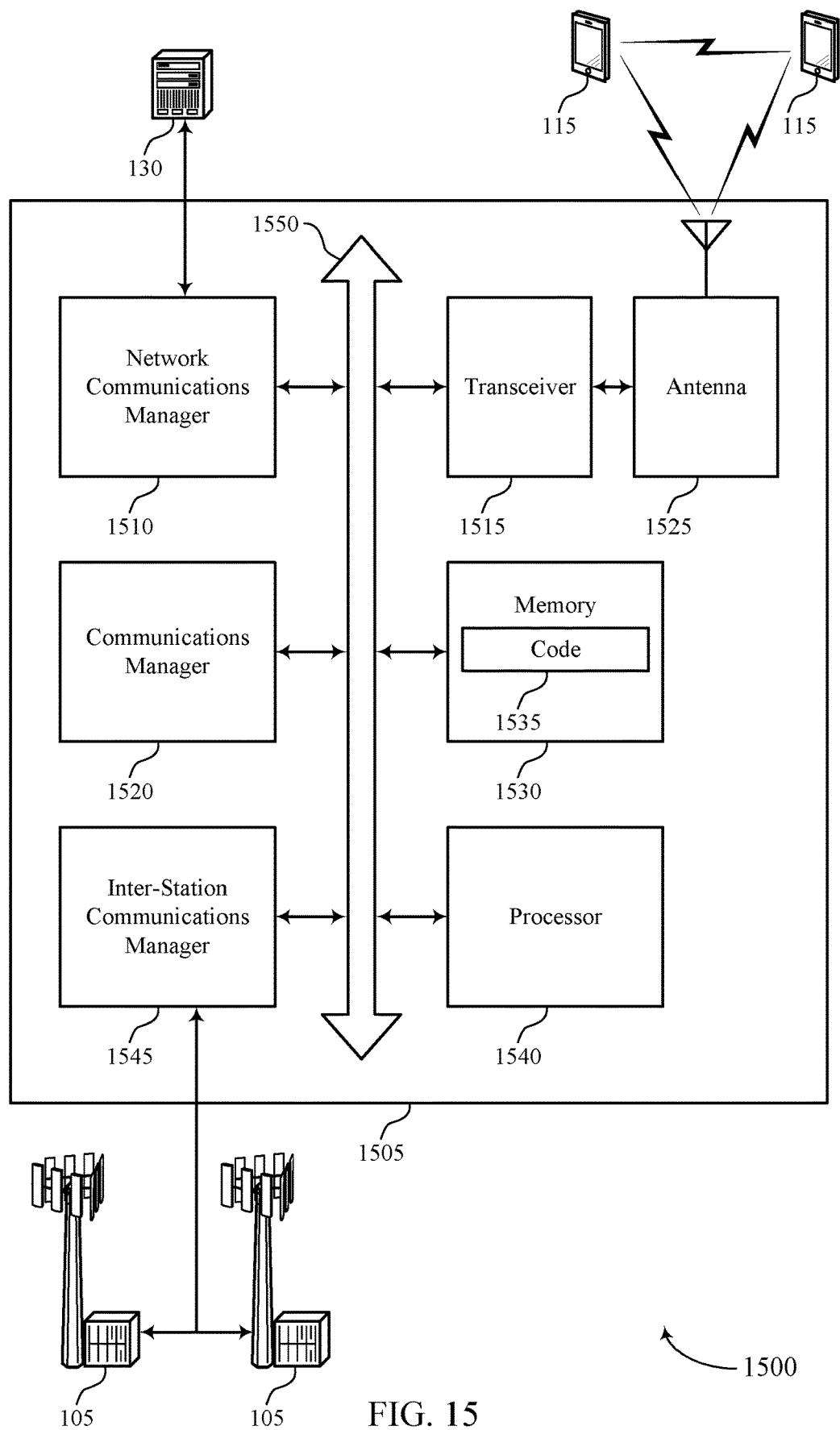
FIG. 15 shows a diagram of a system including a device that supports PUCCH resource allocation techniques in accordance with aspects of the present disclosure.

FIG. 15 shows a diagram of a system 1500 including a device 1505 that supports PUCCH resource allocation techniques in accordance with aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting PUCCH resource allocation techniques). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communication at a base station in accordance with examples as disclosed herein. For example, the communications manager 1520 may be configured as or otherwise support a means for transmitting, to a UE, signaling indicating a first group of PUCCH resource sets associated with a first type of time domain waveform for transmitting uplink control messages and a second group of PUCCH resource sets associated with a second type of time domain waveform for transmitting uplink control messages. The communications manager 1520 may be configured as or otherwise support a means for transmitting, to the UE, DCI indicating a type of time domain waveform for transmitting an uplink control message and a first resource of a selected PUCCH resource set for transmitting the uplink control message, the selected PUCCH resource set from the first group or the second group based on the type of time domain waveform. The communications manager 1520 may be configured as or otherwise support a means for receiving, from the UE and in accordance with the type of time domain waveform, the uplink control message over the first resource of the selected PUCCH resource set.

By including or configuring the communications manager 1520 in accordance with examples as described herein, the device 1505 may support techniques for increased reliability, increased data rates, reduced latency, reduced processing, increased spectral efficiency, reduced power consumption, increased resource utilization, improved coordination between devices, and improved utilization of processing capability, among other benefits.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of PUCCH resource allocation techniques as described herein, or the processor 1540 and the memory 1530 may be otherwise configured to perform or support such operations.

Figure 16:
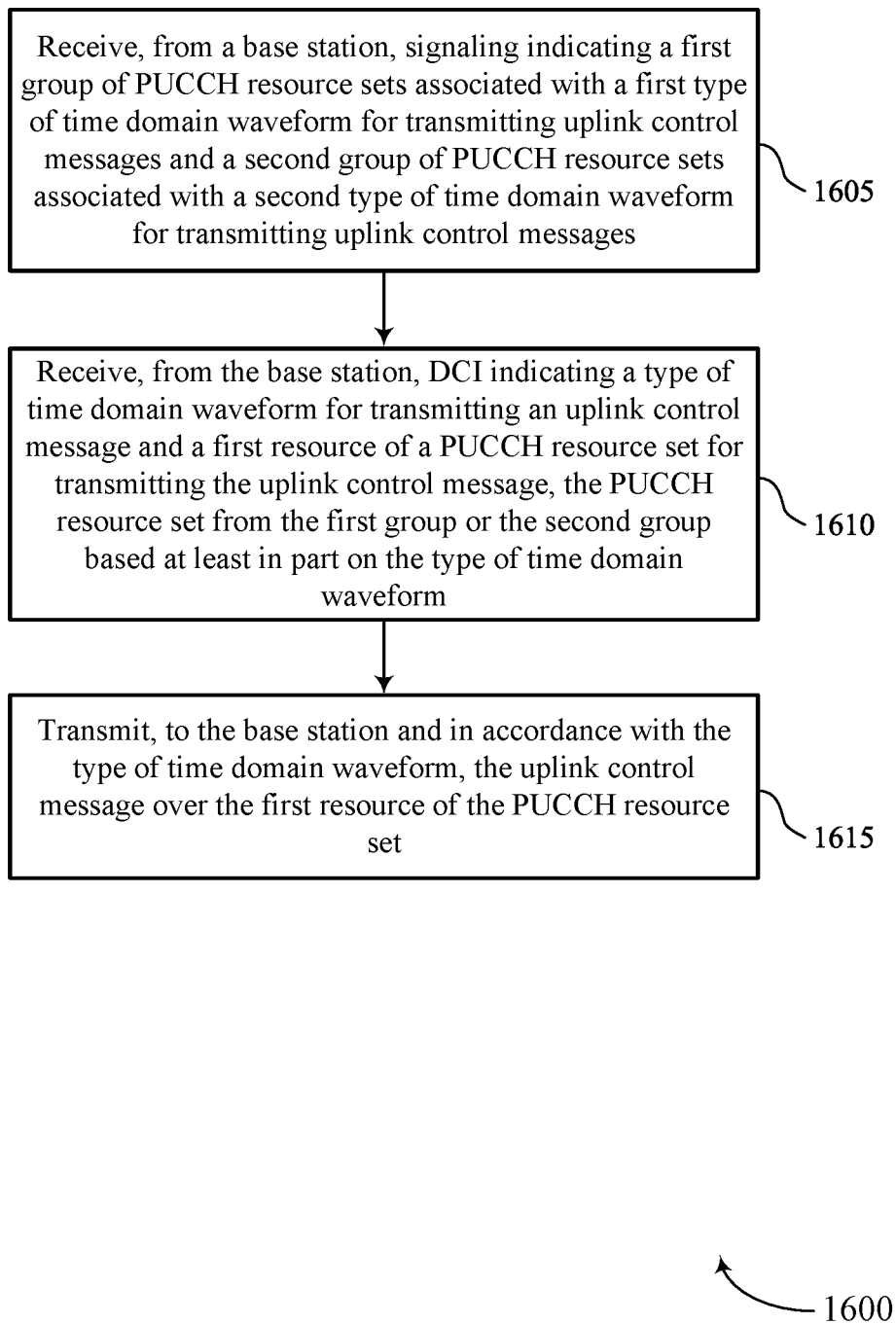
FIGS. 16 through 19 show flowcharts illustrating methods that support PUCCH resource allocation techniques in accordance with aspects of the present disclosure.

FIG. 16 shows a flowchart illustrating a method 1600 that supports PUCCH resource allocation techniques in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, signaling indicating a first group of PUCCH resource sets associated with a first type of time domain waveform for transmitting uplink control messages and a second group of PUCCH resource sets associated with a second type of time domain waveform for transmitting uplink control messages. The operations of 1605 may be performed in accordance with examples as disclosed herein. In some examples, aspects of the operations of 1605 may be performed by a resource set component 1025 as described with reference to FIG. 10.

At 1610, the method may include receiving, from the base station, DCI indicating a type of time domain waveform for transmitting an uplink control message and a first resource of a PUCCH resource set for transmitting the uplink control message, the PUCCH resource set from the first group or the second group based on the type of time domain waveform. The operations of 1610 may be performed in accordance with examples as disclosed herein. In some examples, aspects of the operations of 1610 may be performed by a resource component 1030 as described with reference to FIG. 10.

At 1615, the method may include transmitting, to the base station and in accordance with the type of time domain waveform, the uplink control message over the first resource of the PUCCH resource set. The operations of 1615 may be performed in accordance with examples as disclosed herein. In some examples, aspects of the operations of 1615 may be performed by a communication component 1035 as described with reference to FIG. 10.

Figure 17:
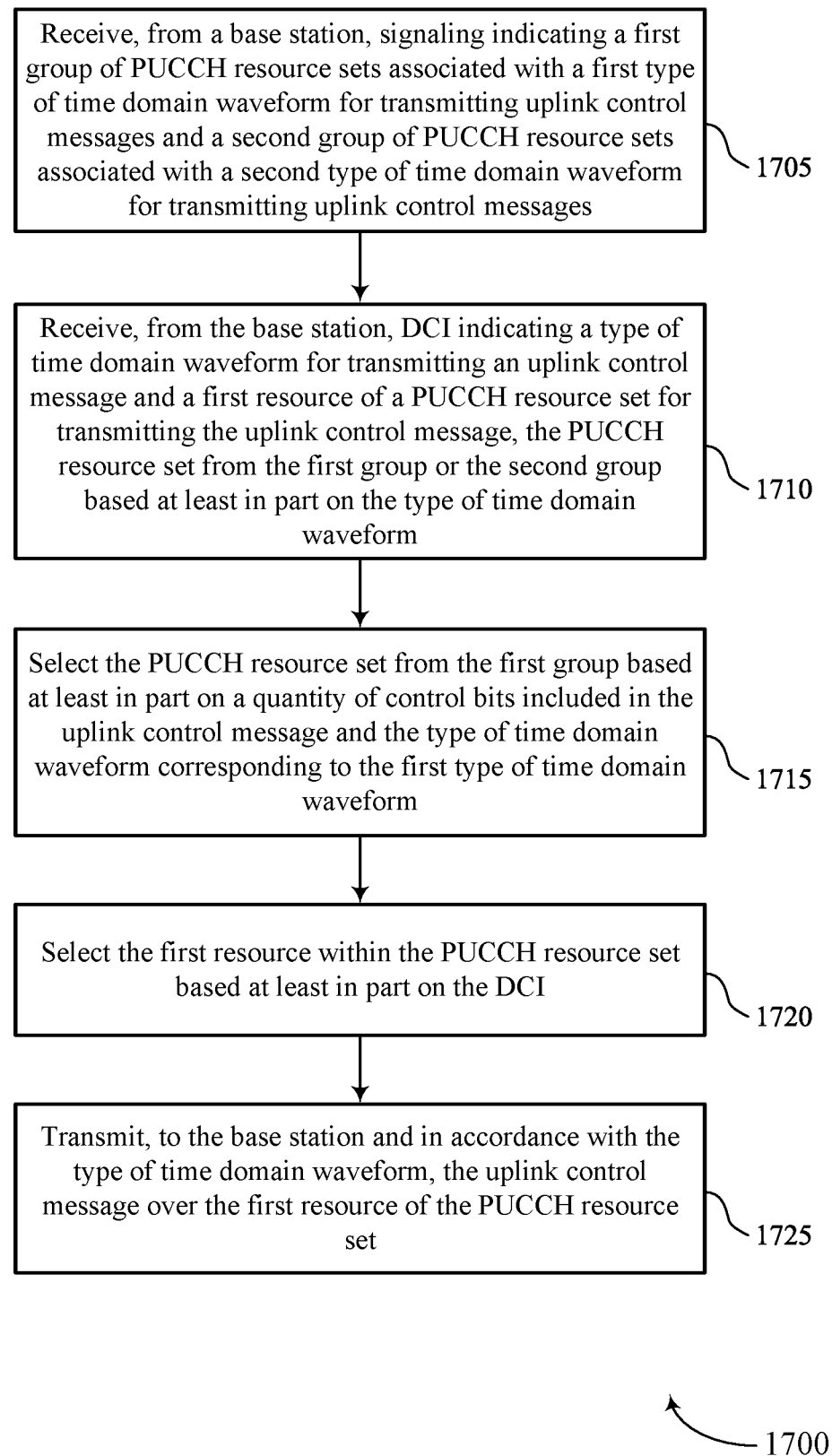

FIG. 17 shows a flowchart illustrating a method 1700 that supports PUCCH resource allocation techniques in accordance with aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, signaling indicating a first group of PUCCH resource sets associated with a first type of time domain waveform for transmitting uplink control messages and a second group of PUCCH resource sets associated with a second type of time domain waveform for transmitting uplink control messages. The operations of 1705 may be performed in accordance with examples as disclosed herein. In some examples, aspects of the operations of 1705 may be performed by a resource set component 1025 as described with reference to FIG. 10.

At 1710, the method may include receiving, from the base station, DCI indicating a type of time domain waveform for transmitting an uplink control message and a first resource of a PUCCH resource set for transmitting the uplink control message, the PUCCH resource set from the first group or the second group based on the type of time domain waveform. The operations of 1710 may be performed in accordance with examples as disclosed herein. In some examples, aspects of the operations of 1710 may be performed by a resource component 1030 as described with reference to FIG. 10.

At 1715, the method may include selecting the PUCCH resource set from the first group based on a quantity of control bits included in the uplink control message and the type of time domain waveform corresponding to the first type of time domain waveform. The operations of 1715 may be performed in accordance with examples as disclosed herein. In some examples, aspects of the operations of 1715 may be performed by a resource set selection component 1040 as described with reference to FIG. 10.

At 1720, the method may include selecting the first resource within the PUCCH resource set based on the DCI. The operations of 1720 may be performed in accordance with examples as disclosed herein. In some examples, aspects of the operations of 1720 may be performed by a resource selection component 1045 as described with reference to FIG. 10.

At 1725, the method may include transmitting, to the base station and in accordance with the type of time domain waveform, the uplink control message over the first resource of the PUCCH resource set. The operations of 1725 may be performed in accordance with examples as disclosed herein. In some examples, aspects of the operations of 1725 may be performed by a communication component 1035 as described with reference to FIG. 10.

Figure 18:
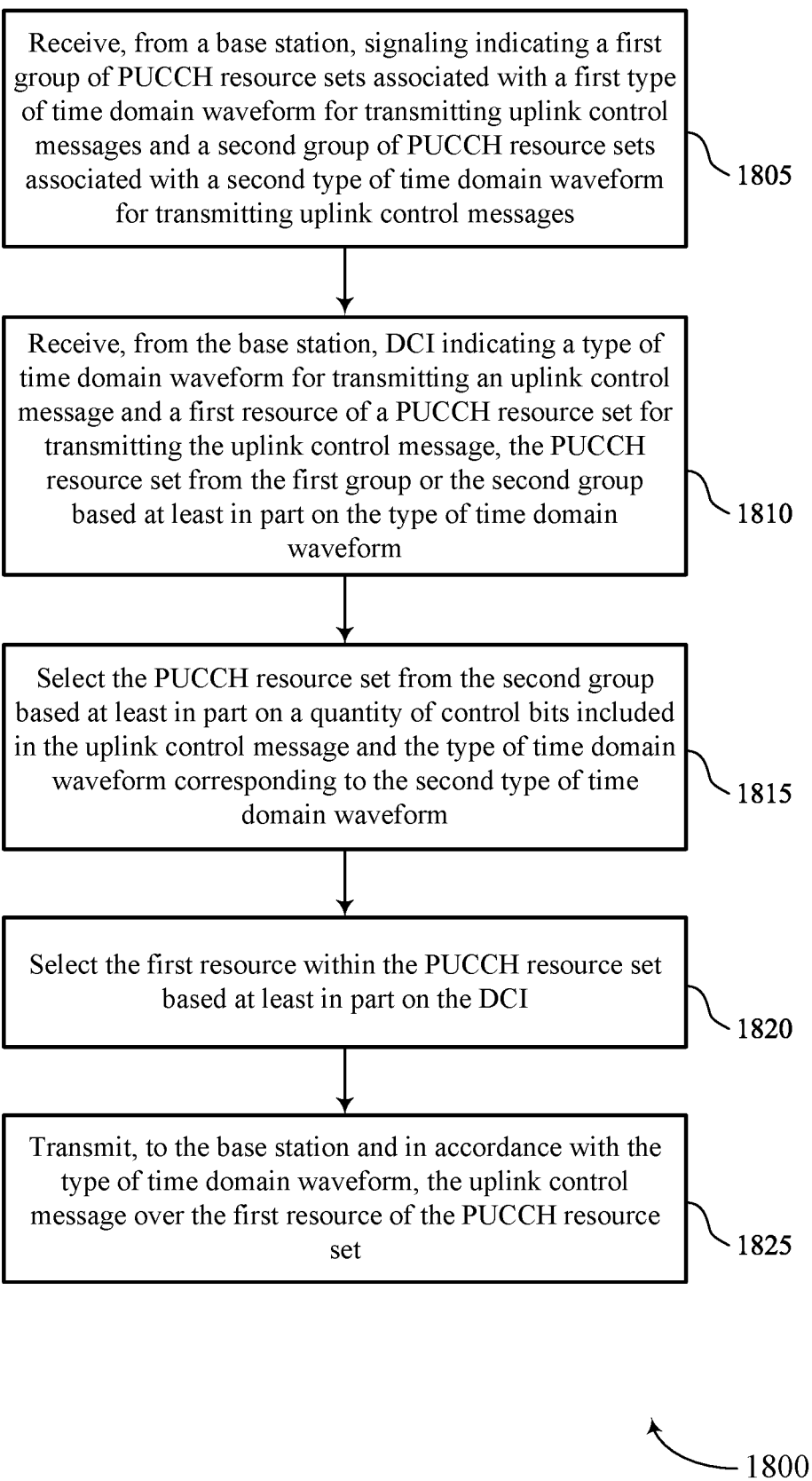

FIG. 18 shows a flowchart illustrating a method 1800 that supports PUCCH resource allocation techniques in accordance with aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1805, the method may include receiving, from a base station, signaling indicating a first group of PUCCH resource sets associated with a first type of time domain waveform for transmitting uplink control messages and a second group of PUCCH resource sets associated with a second type of time domain waveform for transmitting uplink control messages. The operations of 1805 may be performed in accordance with examples as disclosed herein. In some examples, aspects of the operations of 1805 may be performed by a resource set component 1025 as described with reference to FIG. 10.

At 1810, the method may include receiving, from the base station, DCI indicating a type of time domain waveform for transmitting an uplink control message and a first resource of a PUCCH resource set for transmitting the uplink control message, the PUCCH resource set from the first group or the second group based on the type of time domain waveform. The operations of 1810 may be performed in accordance with examples as disclosed herein. In some examples, aspects of the operations of 1810 may be performed by a resource component 1030 as described with reference to FIG. 10.

At 1815, the method may include selecting the PUCCH resource set from the second group based on a quantity of control bits included in the uplink control message and the type of time domain waveform corresponding to the second type of time domain waveform. The operations of 1815 may be performed in accordance with examples as disclosed herein. In some examples, aspects of the operations of 1815 may be performed by a resource set selection component 1040 as described with reference to FIG. 10.

At 1820, the method may include selecting the first resource within the PUCCH resource set based on the DCI. The operations of 1820 may be performed in accordance with examples as disclosed herein. In some examples, aspects of the operations of 1820 may be performed by a resource selection component 1045 as described with reference to FIG. 10.

At 1825, the method may include transmitting, to the base station and in accordance with the type of time domain waveform, the uplink control message over the first resource of the PUCCH resource set. The operations of 1825 may be performed in accordance with examples as disclosed herein. In some examples, aspects of the operations of 1825 may be performed by a communication component 1035 as described with reference to FIG. 10.

Figure 19:
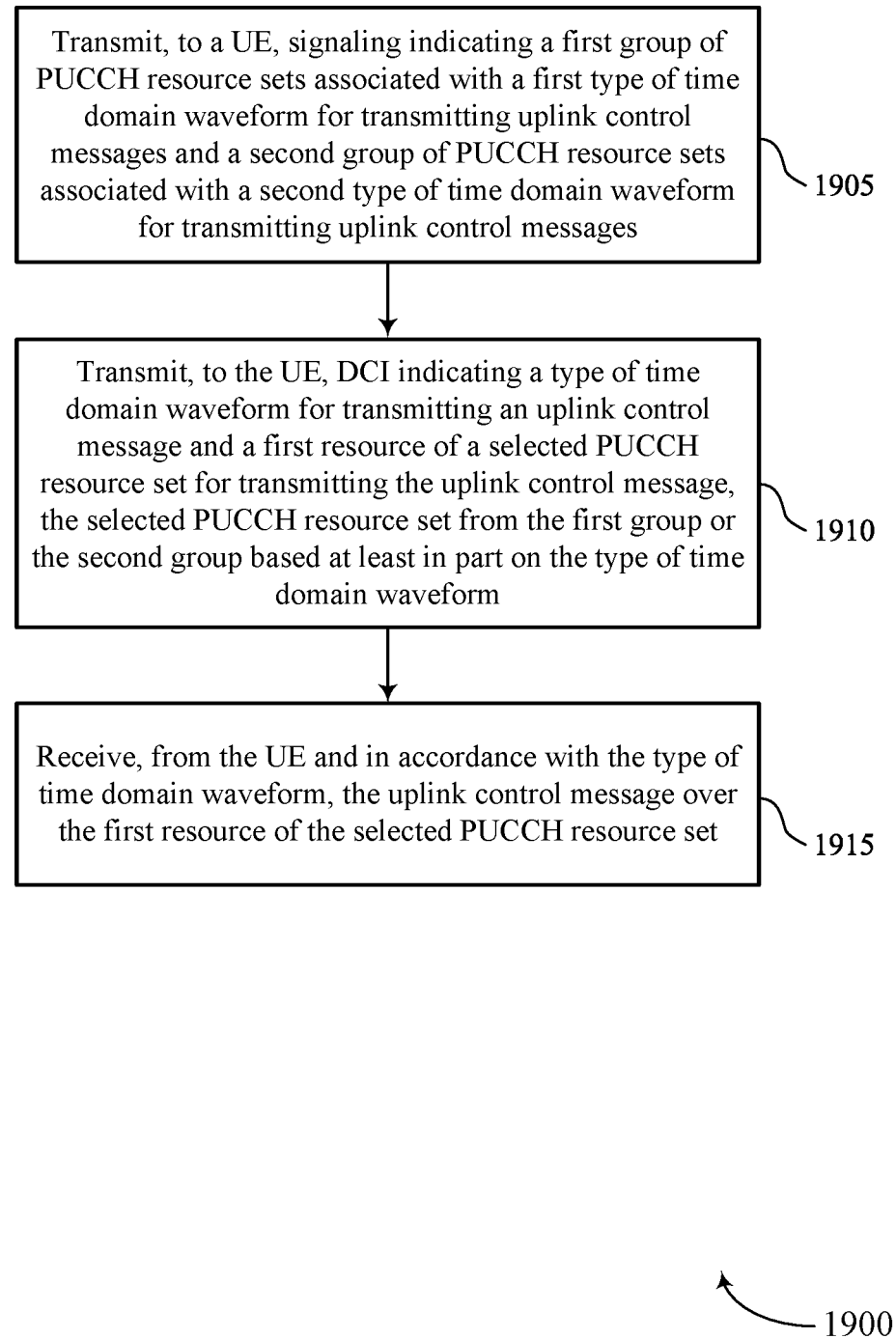

FIG. 19 shows a flowchart illustrating a method 1900 that supports PUCCH resource allocation techniques in accordance with aspects of the present disclosure. The operations of the method 1900 may be implemented by a base station or its components as described herein. For example, the operations of the method 1900 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 1905, the method may include transmitting, to a UE, signaling indicating a first group of PUCCH resource sets associated with a first type of time domain waveform for transmitting uplink control messages and a second group of PUCCH resource sets associated with a second type of time domain waveform for transmitting uplink control messages. The operations of 1905 may be performed in accordance with examples as disclosed herein. In some examples, aspects of the operations of 1905 may be performed by a resource set component 1425 as described with reference to FIG. 14.

At 1910, the method may include transmitting, to the UE, DCI indicating a type of time domain waveform for transmitting an uplink control message and a first resource of a selected PUCCH resource set for transmitting the uplink control message, the selected PUCCH resource set from the first group or the second group based on the type of time domain waveform. The operations of 1910 may be performed in accordance with examples as disclosed herein. In some examples, aspects of the operations of 1910 may be performed by a resource component 1430 as described with reference to FIG. 14.

At 1915, the method may include receiving, from the UE and in accordance with the type of time domain waveform, the uplink control message over the first resource of the selected PUCCH resource set. The operations of 1915 may be performed in accordance with examples as disclosed herein. In some examples, aspects of the operations of 1915 may be performed by a communication component 1435 as described with reference to FIG. 14.

The following provides an overview of aspects of the present disclosure:

Aspect 1: A method for wireless communication at a UE, comprising: receiving, from a base station, signaling indicating a first group of PUCCH resource sets associated with a first type of time domain waveform for transmitting uplink control messages and a second group of PUCCH resource sets associated with a second type of time domain waveform for transmitting uplink control messages; receiving, from the base station, DCI indicating a type of time domain waveform for transmitting an uplink control message and a first resource of a PUCCH resource set for transmitting the uplink control message, the PUCCH resource set from the first group or the second group based at least in part on the type of time domain waveform; and transmitting, to the base station and in accordance with the type of time domain waveform, the uplink control message over the first resource of the PUCCH resource set.

Aspect 2: The method of aspect 1, further comprising: selecting the PUCCH resource set from the first group based at least in part on a quantity of control bits included in the uplink control message and the type of time domain waveform corresponding to the first type of time domain waveform; and selecting the first resource within the PUCCH resource set based at least in part on the DCI.

Aspect 3: The method of aspect 1, further comprising: selecting the PUCCH resource set from the second group based at least in part on a quantity of control bits included in the uplink control message and the type of time domain waveform corresponding to the second type of time domain waveform; and selecting the first resource within the PUCCH resource set based at least in part on the DCI.

Aspect 4: The method of any of aspects 1 and 2, wherein the signaling further indicates a respective quantity of resources included in each PUCCH resource set of the first group, each resource corresponding to a respective set of parameters associated with transmitting uplink control messages over the resource, and wherein the uplink control message is transmitted in accordance with a first set of parameters corresponding to the first resource.

Aspect 5: The method of aspect 4, wherein the first set of parameters comprises a starting symbol of the first resource in a first slot or a first subframe, a first quantity of repetitions of the first resource in the first slot or the first subframe, a second quantity of repetitions of the first resource in a second slot or a second subframe, a starting location of the first resource within the starting symbol, a type of sequence for transmitting the uplink control message, an indication of whether to use one or more cyclic shifts, one or more roots of a sequence, or both, to indicate information included in the uplink control message, a beam hopping configuration, a time hopping configuration, a cover code, or a combination thereof.

Aspect 6: The method of any of aspects 4 through 5, wherein the first set of parameters comprises a quantity of symbols included in the first resource, a quantity of PUCCH components included in the first resource, a length of each PUCCH component, or a combination thereof, the length is based at least in part on a length of a sequence used to transmit uplink control messages over the first resource.

Aspect 7: The method of any of aspects 1 and 3, wherein the signaling further indicates a respective quantity of resources included in each PUCCH resource set of the second group, each resource corresponding to a respective set of parameters associated with transmitting uplink control messages over the resource, and wherein the uplink control message is transmitted in accordance with a first set of parameters corresponding to the first resource.

Aspect 8: The method of aspect 7, wherein the first set of parameters comprises a starting symbol of a first slot or a first subframe, a first quantity of repetitions of the first resource in the first slot or the first subframe, a second quantity of repetitions of the first resource in a second slot or a second subframe, a starting location of a PUCCH within the starting symbol, an indication of whether data, DMRSs, time gaps, or a combination thereof, are multiplexed on the first resource, a density of DMRSs included in the uplink control message, a percentage of signals transmitted over the first resource that are DMRSs, a beam hopping configuration, a time hopping configuration, a cover code, or a combination thereof.

Aspect 9: The method of any of aspects 7 through 8, wherein the first set of parameters comprises a quantity of symbols included in the first resource, a quantity of PUCCH components included in the first resource, a length of each PUCCH component, or a combination thereof.

Aspect 10: The method of aspect 9, wherein the length of each PUCCH component corresponds to a minimum time interval that comprises a DMRS block, a minimum time interval that comprises at least a threshold quantity of DMRS samples, or a fixed time interval that is based at least in part on a bandwidth associated with the first resource.

Aspect 11: The method of any of aspects 7 through 10, wherein the first set of parameters comprises a starting symbol of a first DMRS block that is shared by a set of UEs comprising the UE, a starting location of the first DMRS block in the starting symbol of the first DMRS block, a length of the first DMRS block, a starting symbol of a second DMRS block that is specific to the UE, a starting location of the second DMRS block in the starting symbol of the second DMRS block, a length of the second DMRS block, or a combination thereof.

Aspect 12: The method of any of aspects 1 through 11, wherein each PUCCH resource set of the first group and the second group is associated with transmitting a respective quantity of control bits, and wherein the PUCCH resource set is based at least in part on a quantity of control bits included in the uplink control message.

Aspect 13: The method of any of aspects 1 through 12, wherein the first type of time domain waveform corresponds to a sequence-based time domain waveform that excludes DMRSs, and wherein the second type of time domain waveform corresponds to a time domain waveform that includes one or more DMRSs.

Aspect 14: The method of any of aspects 1 through 13, wherein the first resource of the PUCCH resource set is further indicated based at least in part on a starting location of a PDCCH within a symbol or a slot, the DCI transmitted over the PDCCH.

Aspect 15: A method for wireless communication at a base station, comprising: transmitting, to a UE, signaling indicating a first group of PUCCH resource sets associated with a first type of time domain waveform for transmitting uplink control messages and a second group of PUCCH resource sets associated with a second type of time domain waveform for transmitting uplink control messages; transmitting, to the UE, DCI indicating a type of time domain waveform for transmitting an uplink control message and a first resource of a selected PUCCH resource set for transmitting the uplink control message, the selected PUCCH resource set from the first group or the second group based at least in part on the type of time domain waveform; and receiving, from the UE and in accordance with the type of time domain waveform, the uplink control message over the first resource of the selected PUCCH resource set.

Aspect 16: The method of aspect 15, wherein the signaling further indicates a respective quantity of resources included in each PUCCH resource set of the first group, each resource corresponding to a respective set of parameters associated with transmitting uplink control messages over the resource, and wherein the uplink control message is received in accordance with a first set of parameters corresponding to the first resource.

Aspect 17: The method of aspect 16, wherein the first set of parameters comprises a starting symbol of the first resource in a first slot or a first subframe, a first quantity of repetitions of the first resource in the first slot or the first subframe, a second quantity of repetitions of the first resource in a second slot or a second subframe, a starting location of the first resource within the starting symbol, a type of sequence for transmitting the uplink control message, an indication of whether to use one or more cyclic shifts, one or more roots of a sequence, or both, to indicate information included in the uplink control message, a beam hopping configuration, a time hopping configuration, a cover code, or a combination thereof.

Aspect 18: The method of any of aspects 16 through 17, wherein the first set of parameters comprises a quantity of symbols included in the first resource, a quantity of PUCCH components included in the first resource, a length of each PUCCH component, or a combination thereof, and wherein the length is based at least in part on a length of a sequence used to transmit uplink control messages over the first resource.

Aspect 19: The method of aspect 15, wherein the signaling further indicates a respective quantity of resources included in each PUCCH resource set of the second group, each resource corresponding to a respective set of parameters associated with transmitting uplink control messages over the resource, and wherein the uplink control message is received in accordance with a first set of parameters corresponding to the first resource.

Aspect 20: The method of aspect 19, wherein the first set of parameters comprises a starting symbol of a first slot or a first subframe, a first quantity of repetitions of the first resource in the first slot or the first subframe, a second quantity of repetitions of the first resource in a second slot or a second subframe, a starting location of a PUCCH within the starting symbol, an indication of whether data, DMRSs, time gaps, or a combination thereof, are multiplexed on the first resource, a density of DMRSs included in the uplink control message, a percentage of signals transmitted over the first resource that are DMRSs, a beam hopping configuration, a time hopping configuration, a cover code, or a combination thereof.

Aspect 21: The method of any of aspects 19 through 20, wherein the first set of parameters comprises a quantity of symbols included in the first resource, a quantity of PUCCH components included in the first resource, a length of each PUCCH component, or a combination thereof.

Aspect 22: The method of aspect 21, wherein the length of each PUCCH component corresponds to a minimum time interval that comprises a DMRS block, a minimum time interval that comprises at least a threshold quantity of DMRS samples, or a fixed time interval that is based at least in part on a bandwidth associated with the first resource.

Aspect 23: The method of any of aspects 19 through 22, wherein the first set of parameters comprises a starting symbol of a first DMRS block that is shared by a set of UEs comprising the UE, a starting location of the first DMRS block in the starting symbol of the first DMRS block, a length of the first DMRS block, a starting symbol of a second DMRS block that is specific to the UE, a starting location of the second DMRS block in the starting symbol of the second DMRS block, a length of the second DMRS block, or a combination thereof.

Aspect 24: The method of any of aspects 15 through 23, wherein each PUCCH resource set of the first group and the second group is associated with transmitting a respective quantity of control bits, and wherein the selected PUCCH resource set is based at least in part on a quantity of control bits included in the uplink control message.

Aspect 25: The method of any of aspects 15 through 24, wherein the first type of time domain waveform corresponds to a sequence-based time domain waveform that excludes DMRSs; and the second type of time domain waveform corresponds to a time domain waveform that includes one or more DMRSs.

Aspect 26: The method of any of aspects 15 through 25, wherein the first resource of the selected PUCCH resource set is further indicated based at least in part on a starting location of a PDCCH within a symbol or a slot, the DCI transmitted over the PDCCH.

Aspect 27: An apparatus for wireless communication at a UE, comprising a processor; memory coupled with the processor; and instructions stored in the memory and executable by the processor to cause the apparatus to perform a method of any of aspects 1 through 14.

Aspect 28: An apparatus for wireless communication at a UE, comprising at least one means for performing a method of any of aspects 1 through 14.

Aspect 29: A non-transitory computer-readable medium storing code for wireless communication at a UE, the code comprising instructions executable by a processor to perform a method of any of aspects 1 through 14.

Aspect 30: An apparatus for wireless communication at a base station, comprising a processor; memory coupled with the processor; and instructions stored in the memory and executable by the processor to cause the apparatus to perform a method of any of aspects 15 through 26.

Aspect 31: An apparatus for wireless communication at a base station, comprising at least one means for performing a method of any of aspects 15 through 26.

Aspect 32: A non-transitory computer-readable medium storing code for wireless communication at a base station, the code comprising instructions executable by a processor to perform a method of any of aspects 15 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a network entity, comprising:

transmitting, to a user equipment (UE), signaling indicating a first group of physical uplink control channel resource sets and a second group of physical uplink control channel resource sets different than the first group, wherein each physical uplink control channel resource set within the first group of physical uplink control channel resource sets correspond to a respective set of parameters associated with transmitting uplink control messages over resources in the resource set according to a first type of time domain waveform for transmitting uplink control messages, and wherein each physical uplink control channel resource set within the second group of physical uplink control channel resource sets corresponds to a respective set of parameters associated with transmitting uplink control messages over resources in the resource set according to a second type of time domain waveform;

transmitting, to the UE, downlink control information indicating a type of time domain waveform for transmitting an uplink control message and a first resource of a selected physical uplink control channel resource set for transmitting the uplink control message, the selected physical uplink control channel resource set from the first group or the second group based at least in part on the type of time domain waveform; and receiving, from the UE and in accordance with the type of time domain waveform and a set of parameters corresponding to the first resource, the uplink control message over the first resource of the selected physical uplink control channel resource set.

2. The method of claim 1, wherein the signaling further indicates a respective quantity of resources included in each physical uplink control channel resource set of the first group.

3. The method of claim 2, wherein the first set of parameters comprises a starting symbol of the first resource in a first slot or a first subframe, a first quantity of repetitions of the first resource in the first slot or the first subframe, a second quantity of repetitions of the first resource in a second slot or a second subframe, a starting location of the first resource within the starting symbol, a type of sequence for transmitting the uplink control message, an indication of whether to use one or more cyclic shifts, one or more roots of a sequence, or both, to indicate information included in the uplink control message, a beam hopping configuration, a time hopping configuration, a cover code, or a combination thereof.

4. The method of claim 2, wherein the first set of parameters comprises a quantity of symbols included in the first resource, a quantity of physical uplink control channel components included in the first resource, a length of each physical uplink control channel component, or a combination thereof, and wherein the length is based at least in part on a length of a sequence used to transmit uplink control messages over the first resource.

5. The method of claim 1, wherein the signaling further indicates a respective quantity of resources included in each physical uplink control channel resource set of the second group.

6. The method of claim 5, wherein the first set of parameters comprises a starting symbol of the first resource in a first slot or a first subframe, a first quantity of repetitions of the first resource in the first slot or the first subframe, a second quantity of repetitions of the first resource in a second slot or a second subframe, a starting location of a physical uplink control channel within the starting symbol, an indication of whether data, demodulation reference signals, time gaps, or a combination thereof, are multiplexed on the first resource, a density of demodulation reference signals included in the uplink control message, a percentage of signals transmitted over the first resource that are demodulation reference signals, a beam hopping configuration, a time hopping configuration, a cover code, or a combination thereof.

7. The method of claim 5, wherein the first set of parameters comprises a quantity of symbols included in the first resource, a quantity of physical uplink control channel components included in the first resource, a length of each physical uplink control channel component, or a combination thereof.

8. The method of claim 7, wherein the length of each physical uplink control channel component corresponds to a first minimum time interval that comprises a demodulation reference signal block, a second minimum time interval that comprises at least a threshold quantity of demodulation reference signal samples, or a fixed time interval that is based at least in part on a bandwidth associated with the first resource.

9. The method of claim 5, wherein the first set of parameters comprises a starting symbol of a first demodulation reference signal block that is shared by a set of UEs comprising the UE, a starting location of the first demodulation reference signal block in the starting symbol of the first demodulation reference signal block, a length of the first demodulation reference signal block, a starting symbol of a second demodulation reference signal block that is specific to the UE, a starting location of the second demodulation reference signal block in the starting symbol of the second demodulation reference signal block, a length of the second demodulation reference signal block, or a combination thereof.

10. The method of claim 1, wherein each physical uplink control channel resource set of the first group and the second group is associated with transmitting a respective quantity of control bits, and wherein the selected physical uplink control channel resource set is based at least in part on a quantity of control bits included in the uplink control message.

11. The method of claim 1, wherein:
the first type of time domain waveform corresponds to a sequence-based time domain waveform that excludes demodulation reference signals; and
the second type of time domain waveform corresponds to a time domain waveform that includes one or more demodulation reference signals.

12. The method of claim 1, wherein the first resource of the selected physical uplink control channel resource set is further indicated based at least in part on a starting location of a physical downlink control channel within a symbol or a slot, the downlink control information transmitted over the physical downlink control channel.

13. A method for wireless communication at a user equipment (UE), comprising:
receiving, from a network entity, signaling indicating a first group of physical uplink control channel resource sets and a second group of physical uplink control channel resource sets different than the first group, wherein each physical uplink control channel resource set within the first group of physical uplink control channel resource sets correspond to a respective set of parameters associated with transmitting uplink control messages over resources in the resource set according to a first type of time domain waveform for transmitting uplink control messages, and wherein each physical uplink control channel resource set within the second group of physical uplink control channel resource sets corresponds to a respective set of parameters associated with transmitting uplink control messages over resources in the resource set according to a second type of time domain waveform;
receiving, from the network entity, downlink control information indicating a type of time domain waveform for transmitting an uplink control message and a first resource of a physical uplink control channel resource set for transmitting the uplink control message, the physical uplink control channel resource set from the first group or the second group based at least in part on the type of time domain waveform; and
transmitting, to the network entity and in accordance with the type of time domain waveform and a set of parameters corresponding to the first resource, the uplink control message over the first resource of the physical uplink control channel resource set.

14. The method of claim 13, further comprising:
selecting the physical uplink control channel resource set from the first group based at least in part on a quantity of control bits included in the uplink control message and the type of time domain waveform corresponding to the first type of time domain waveform; and
selecting the first resource within the physical uplink control channel resource set based at least in part on the downlink control information.

15. The method of claim 13, further comprising:
selecting the physical uplink control channel resource set from the second group based at least in part on a quantity of control bits included in the uplink control message and the type of time domain waveform corresponding to the second type of time domain waveform; and
selecting the first resource within the physical uplink control channel resource set based at least in part on the downlink control information.

16. The method of claim 13, wherein the signaling further indicates a respective quantity of resources included in each physical uplink control channel resource set of the first group.

17. The method of claim 16, wherein the first set of parameters comprises a starting symbol of the first resource in a first slot or a first subframe, a first quantity of repetitions of the first resource in the first slot or the first subframe, a second quantity of repetitions of the first resource in a second slot or a second subframe, a starting location of the first resource within the starting symbol, a type of sequence for transmitting the uplink control message, an indication of whether to use one or more cyclic shifts, one or more roots of a sequence, or both, to indicate information included in the uplink control message, a beam hopping configuration, a time hopping configuration, a cover code, or a combination thereof.

18. The method of claim 16, wherein the first set of parameters comprises a quantity of symbols included in the first resource, a quantity of physical uplink control channel components included in the first resource, a length of each physical uplink control channel component, or a combination thereof, wherein the length is based at least in part on a length of a sequence used to transmit uplink control messages over the first resource.

19. The method of claim 13, wherein the signaling further indicates a respective quantity of resources included in each physical uplink control channel resource set of the second group.

20. The method of claim 19, wherein the first set of parameters comprises a starting symbol of the first resource in a first slot or a first subframe, a first quantity of repetitions of the first resource in the first slot or the first subframe, a second quantity of repetitions of the first resource in a second slot or a second subframe, a starting location of a physical uplink control channel within the starting symbol, an indication of whether data, demodulation reference signals, time gaps, or a combination thereof, are multiplexed on the first resource, a density of demodulation reference signals included in the uplink control message, a percentage of signals transmitted over the first resource that are demodulation reference signals, a beam hopping configuration, a time hopping configuration, a cover code, or a combination thereof.

21. The method of claim 19, wherein the first set of parameters comprises a quantity of symbols included in the first resource, a quantity of physical uplink control channel components included in the first resource, a length of each physical uplink control channel component, or a combination thereof.

22. The method of claim 21, wherein the length of each physical uplink control channel component corresponds to a first minimum time interval that comprises a demodulation reference signal block, a second minimum time interval that comprises at least a threshold quantity of demodulation reference signal samples, or a fixed time interval that is based at least in part on a bandwidth associated with the first resource.

23. The method of claim 19, wherein the first set of parameters comprises a starting symbol of a first demodulation reference signal block that is shared by a set of UEs comprising the UE, a starting location of the first demodulation reference signal block in the starting symbol of the first demodulation reference signal block, a length of the first demodulation reference signal block, a starting symbol of a second demodulation reference signal block that is specific to the UE, a starting location of the second demodulation reference signal block in the starting symbol of the second demodulation reference signal block, a length of the second demodulation reference signal block, or a combination thereof.

24. The method of claim 13, wherein each physical uplink control channel resource set of the first group and the second group is associated with transmitting a respective quantity of control bits, and wherein the physical uplink control channel resource set is based at least in part on a quantity of control bits included in the uplink control message.

25. The method of claim 13, wherein:
the first type of time domain waveform corresponds to a sequence-based time domain waveform that excludes demodulation reference signals; and
the second type of time domain waveform corresponds to a time domain waveform that includes one or more demodulation reference signals.

26. The method of claim 13, wherein the first resource of the physical uplink control channel resource set is further indicated based at least in part on a starting location of a physical downlink control channel within a symbol or a slot, the downlink control information transmitted over the physical downlink control channel.

27. An apparatus for wireless communication at a network entity, comprising:
a processor;
memory coupled with the processor; and
instructions stored in the memory and executable by the processor to cause the apparatus to:
transmit, to a user equipment (UE), signaling indicating a first group of physical uplink control channel resource sets and a second group of physical uplink control channel resource sets different than the first group, wherein each physical uplink control channel resource set within the first group of physical uplink control channel resource sets correspond to a respective set of parameters associated with transmitting uplink control messages over resources in the resource set according to a first type of time domain waveform for transmitting uplink control messages, and wherein each physical uplink control channel resource set within the second group of physical uplink control channel resource sets corresponds to a respective set of parameters associated with transmitting uplink control messages over resources in the resource set according to a second type of time domain waveform;
transmit, to the UE, downlink control information indicating a type of time domain waveform for transmitting an uplink control message and a first resource of a selected physical uplink control channel resource set for transmitting the uplink control message, the selected physical uplink control channel resource set from the first group or the second group based at least in part on the type of time domain waveform; and
receive, from the UE and in accordance with the type of time domain waveform and a set of parameters corresponding to the first resource, the uplink control message over the first resource of the selected physical uplink control channel resource set.

28. An apparatus for wireless communication at a user equipment (UE), comprising:
a processor;
memory coupled with the processor; and
instructions stored in the memory and executable by the processor to cause the apparatus to:
receive, from a network entity, signaling indicating a first group of physical uplink control channel resource sets and a second group of physical uplink control channel resource sets different than the first group, wherein each physical uplink control channel resource set within the first group of physical uplink control channel resource sets correspond to a respective set of parameters associated with transmitting uplink control messages over resources in the resource set according to a first type of time domain waveform for transmitting uplink control messages, and wherein each physical uplink control channel resource set within the second group of physical uplink control channel resource sets corresponds to a respective set of parameters associated with transmitting uplink control messages over resources in the resource set according to a second type of time domain waveform;
receive, from the network entity, downlink control information indicating a type of time domain waveform for transmitting an uplink control message and a first resource of a physical uplink control channel resource set for transmitting the uplink control message, the physical uplink control channel resource set from the first group or the second group based at least in part on the type of time domain waveform; and transmit, to the network entity and in accordance with the type of time domain waveform and a set of parameters corresponding to the first resource, the uplink control message over the first resource of the physical uplink control channel resource set.

29. The apparatus of claim 28, wherein the instructions are further executable by the processor to cause the apparatus to:

select the physical uplink control channel resource set from the first group based at least in part on a quantity of control bits included in the uplink control message and the type of time domain waveform corresponding to the first type of time domain waveform; and select the first resource within the physical uplink control channel resource set based at least in part on the downlink control information.

30. The apparatus of claim 28, wherein the instructions are further executable by the processor to cause the apparatus to:

select the physical uplink control channel resource set from the second group based at least in part on a quantity of control bits included in the uplink control message and the type of time domain waveform corresponding to the second type of time domain waveform; and select the first resource within the physical uplink control channel resource set based at least in part on the downlink control information.

* * * * *